(12) United States Patent
Sun et al.

(10) Patent No.: US 8,539,288 B1
(45) Date of Patent: Sep. 17, 2013

(54) METHODS AND APPARATUS FOR MULTIPLE INPUT MULTIPLE OUTPUT (MIMO) SUCCESSIVE INTERFERENCE CANCELLATION (SIC) WITH RETRANSMISSIONS

(75) Inventors: Yakun Sun, Sunnyvale, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 259 days.

(21) Appl. No.: 13/165,832

(22) Filed: Jun. 22, 2011

Related U.S. Application Data

(60) Provisional application No. 61/357,875, filed on Jun. 23, 2010.

(51) Int. Cl.
*G08C 25/02* (2006.01)
(52) U.S. Cl.
USPC ............ 714/704; 714/748; 375/346; 375/227
(58) Field of Classification Search
None
See application file for complete search history.

(56) References Cited

U.S. PATENT DOCUMENTS

| | | | | |
|---|---|---|---|---|
| 6,108,374 A | * | 8/2000 | Balachandran et al. | 375/227 |
| 7,173,979 B1 | * | 2/2007 | Badri et al. | 375/308 |
| 8,301,956 B2 | * | 10/2012 | Pi et al. | 714/749 |
| 8,351,524 B2 | * | 1/2013 | Zhou | 375/260 |

* cited by examiner

*Primary Examiner* — Christine Tu

(57) ABSTRACT

Systems and methods are provided for determining a successive interference cancellation (SIC) decoding ordering in a multiple input multiple output transmission (MIMO) system with retransmissions. A plurality of codewords is transmitted in a current transmission time. Some of the codewords may have been previously transmitted in previous transmission attempts according to a retransmission protocol. The plurality of codewords is received and an ordering metric is computed for a received codeword based on channels associated with multiple transmission attempts of the codeword. A decoding ordering of the codewords is determined based on the computed ordering metric. Performance parameters such as Packet Error Rate (PER), channel gain, and/or equalizer-output Signal-to-Interference and Noise Ratio (SINR) may be used to evaluate a channel quality for each one of the transmission attempts of the codeword. The ordering metric may be updated recursively with each transmission attempt.

20 Claims, 15 Drawing Sheets

$$\text{SINR}_{s,\text{before}}(m) = \frac{1}{\left\langle \left(\mathbf{H}(m;t)^H \mathbf{H}(m;t) + \sigma^{(t)2}\mathbf{I}\right)^{-1} \right\rangle_{s,s} \sigma^{(t)2}} - 1 \quad \swarrow 902$$

$$\text{SINR}_{s,\text{after}}(m) = \underbrace{\text{SINR}_{s,\text{before}}(m)}_{} \quad s = L_1^{(k)} \swarrow 906$$
$$\qquad \frac{\|\mathbf{h}_{L_2}(m;t)\|^2}{\sigma^{(t)2}} \quad s = L_2^{(k)} \swarrow 908$$

$$\swarrow 904$$

$$\text{SINR}_{L_2,\text{after}} = \frac{\|\mathbf{h}_{L_2}(m;t)\|^2}{\frac{|\mathbf{h}_{L_2}(m;t)^H \mathbf{h}_{L_1}(m;t)|^2}{\|\mathbf{h}_{L_2}(m;t)\|^2} \underbrace{E[|e|^2] + \sigma^{(t)2}}_{922}} \quad \swarrow 920$$

FIG. 9

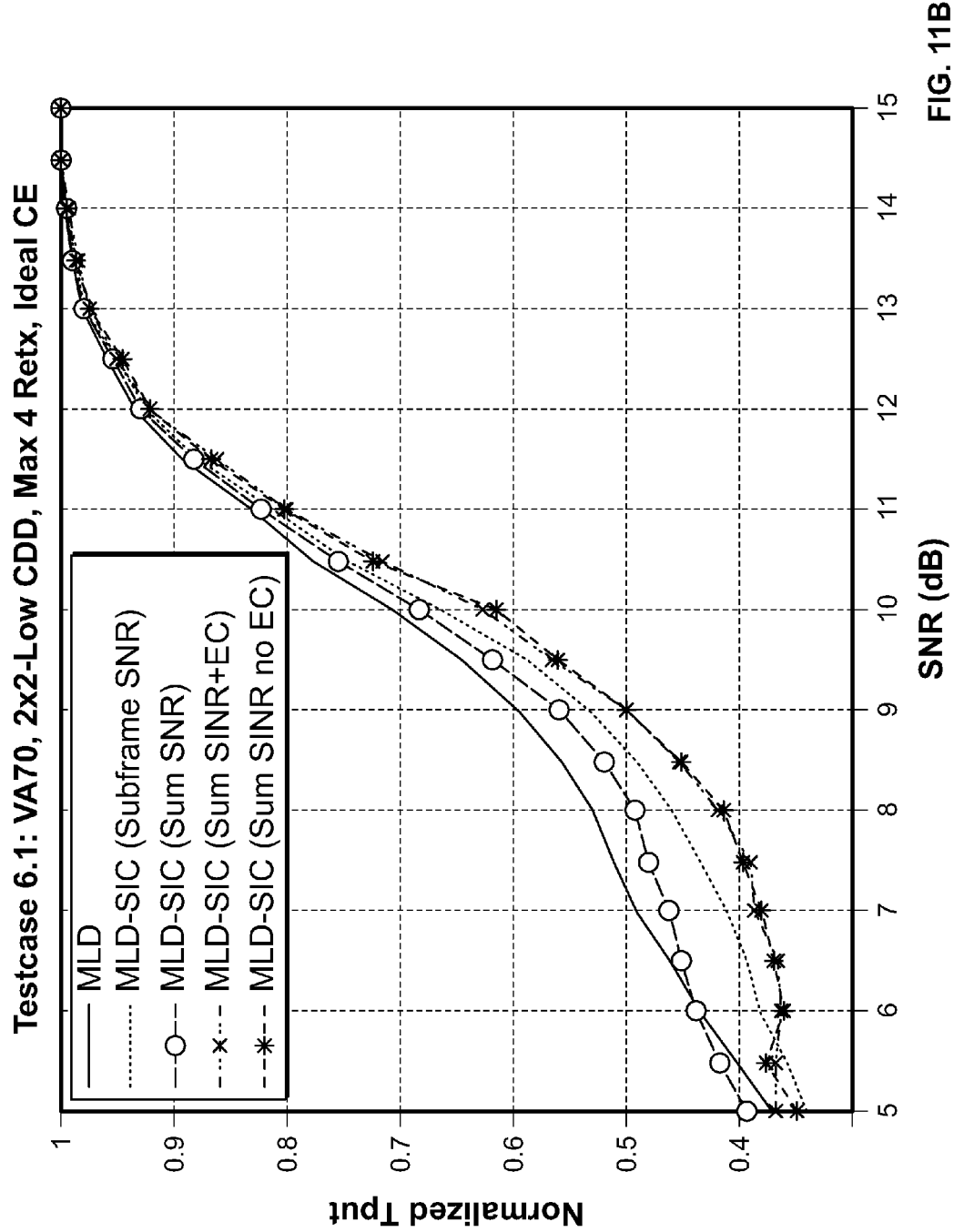

METHODS AND APPARATUS FOR MULTIPLE INPUT MULTIPLE OUTPUT (MIMO) SUCCESSIVE INTERFERENCE CANCELLATION (SIC) WITH RETRANSMISSIONS

CROSS-REFERENCE TO RELATED APPLICATIONS

This present disclosure claims benefit under 35 U.S.C. §119(e) of U.S. Provisional Application No. 61/357,875, filed Jun. 23, 2010, which is hereby incorporated herein by reference in its entirety.

BACKGROUND OF THE INVENTION

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates to communication systems, and more particularly, to performing successive interference cancellation (SIC) in multiple input multiple output (MIMO) systems with retransmissions.

In a data transmission system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

However, the transmitter may be unaware of how the channel will affect a transmitted signal, and may not be able to transmit information in a way that will be effective for a particular channel. For example, the transmitter may be a wireless router, where the channel varies depending on its surroundings. One technique to increase reliability when the transmitter does not have information about the channel is to use an error correction scheme. An error correction scheme functions by adding redundancy to the transmitted information. Therefore, when a reasonably small number of errors occurs, there is still enough information to make an accurate determination of the transmitted sequence. The redundancy added to the transmitted information is determined based on an error correction code, such as a Reed-Solomon or Golay code.

One straightforward way to implement an error correction scheme is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc).

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). One type of HARQ, referred to as HARQ type-I, typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not the same as the data that was sent originally. HARQ type-II and type-III utilize incremental redundancy (IR HARQ) in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

Successive interference cancellation (SIC) is another technique for improving the performance of a data transmission system. According to this technique, a received codeword that is associated with strong channel conditions is decoded before other codewords that are associated with weak channel conditions. Effects of the decoded codeword are subtracted from a received signal vector to eliminate interference due to the decoded codeword from the other codewords. In this way, the other codewords may experience less interference and are able to achieve a higher Signal-to-Noise Ratio (SNR) than without interference cancellation.

The order in which codewords are decoded may have an important impact on the SIC performance. Conventional SIC methods decode codewords in an order that is based on channel parameters (e.g., channel quality) associated with each received codeword at the receiving time only. However, the channel quality may change over multiple transmission attempts of the same codeword.

SUMMARY OF THE INVENTION

In view of the foregoing, systems and methods are provided for performing successive interference cancellation (SIC) in a multiple input multiple output transmission (MIMO) system with retransmissions.

In some embodiments, a plurality of codewords transmitted in a current transmission time is received. The received codewords include at least one retransmitted codeword that was previously transmitted in a previous transmission time. For the at least one previously transmitted codeword, an ordering metric is computed based on a first channel associated with the previous transmission time and a second channel associated with the current transmission time. A decoding ordering of the codewords is determined based on the computed ordering metric.

In some implementations, an ordering metric is computed for a received codeword based on the channels associated with any subset of all previous transmission times corresponding to all previous transmission attempts of the codeword.

In some implementations, the ordering metric is computed based on performance parameters such as Packet Error Rate (PER), channel gain, and/or equalizer-output Signal-to-Interference and Noise Ratio (SINR) evaluated over multiple transmission attempts of the codeword.

BRIEF DESCRIPTION OF THE FIGURES

The above and other aspects and potential advantages of the present disclosure will be apparent upon consideration of the following detailed description, taken in conjunction with the accompanying drawings, in which like reference characters refer to like parts throughout, and in which:

FIG. 9 illustrates one example of the incremental SINR based ordering approach of FIG. 8B, in accordance with some embodiments of the present disclosure;

FIG. 11B shows a simulated performance of processes for determining SIC orderings in an closed loop MIMO system using MLD, in accordance with some embodiments of the present disclosure.

DETAILED DESCRIPTION OF THE INVENTION

The present disclosure generally relates to performing successive interference cancellation (SIC) in a multiple input multiple output transmission (MIMO) system with a retransmission protocol. In one aspect, codewords may be ordered based on channels associated with all previous transmission attempts of the codeword.

Figure 1:
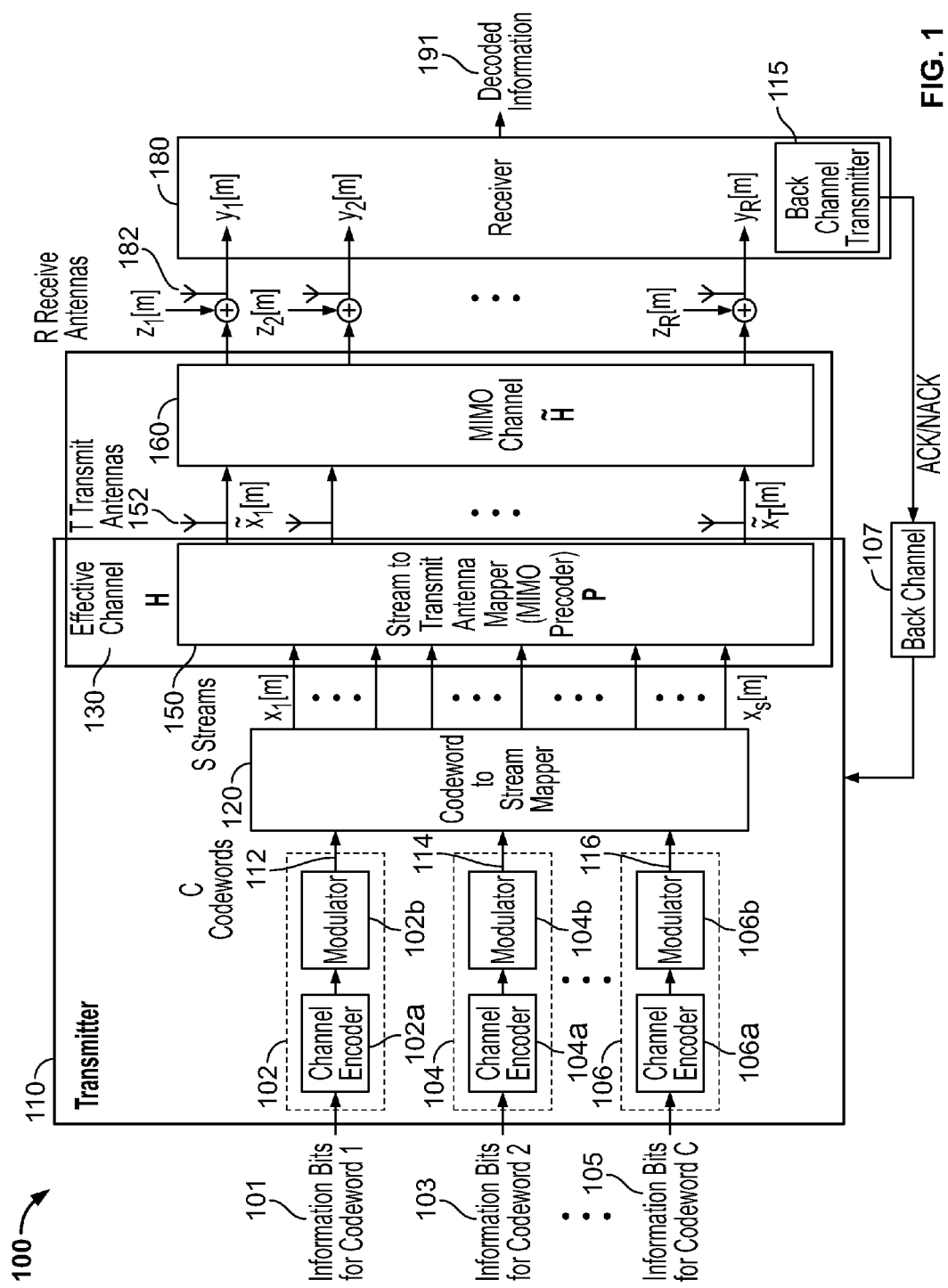
FIG. 1 is a high level block diagram of a data transmission system, in accordance with some embodiments of the present disclosure.

FIG. 1 shows an illustration of a data transmission system 100 in accordance with some embodiments. The system of FIG. 1 includes transmitter 110, channel 160, and receiver 180. In some embodiments, data to be transmitted may be divided between a large number of transmission systems such as system 100, where each system corresponds to one parallel transmission. For example, system 100 may correspond to one subcarrier that carries data in a particular frequency range, or a tone. In some embodiments, the illustrated system may represent a wireless communication system. In these embodiments, transmitter 110 may be a wireless router and receiver 180 may be a wireless receiver, such as a mobile telephone, computer, laptop, hand held device, or other such device. The components shown in transmitter 110 and receiver 180 may be implemented by a single integrated circuit (IC) or as separate components in a circuit board or implemented on a programmable logic device. These components may be implemented on separate devices or circuits and networked together.

Transmitter 110 may process C information bit sequences to produce C codewords using encoder and modulator blocks. For example, encoder and modulator blocks 102, 104, and 106 may process bit sequences 101, 103, and 105, to output codewords 112, 114, and 116, respectively. Although the present disclosure is described in terms of binary data, the bit sequences 101, 103, and 105 may be replaced with a sequence of non-binary digits or another type of information-containing symbol without departing from the scope of the present disclosure. In some embodiments, encoder and modulator blocks 102, 104, and 106 may include encoders 102a, 104a, and 106a respectively, e.g., that employ error correction or error detection codes to encode bit sequences 101, 103, and 105. For example, encoders 102a, 104a, and 106a may encode bit sequences 101, 103, and 105 using CRC code, convolutional code, Turbo code, LDPC code, or any other suitable code. Encoder and modulator blocks 102, 104, and 106 may additionally include modulators 102*b*, 104*b*, and 106*b* respectively, to modulate the encoded bit sequences of bit sequences 101, 103 and 105 based on any appropriate modulation scheme, such quadrature amplitude modulation (QAM), pulse amplitude modulation (PAM), or phase shift keying (PSK). Although encoder and modulator blocks 102, 104, and 106 are illustrated as separate blocks, these blocks may be implemented as one or multiple encoder and modulator units.

Codeword to stream mapper 120 may process the C codewords output by the encoder and modulator blocks (e.g., encoder and modulator blocks 112, 114, and 116) to output S streams. These S streams are represented by coded values $x_1[m]$ through $x_S[m]$, where m is a transmission index associated with a transmission instance. A transmission instance may be defined in time domain or frequency domain or any combination thereof. In some embodiments, m may refer to the index of symbols sent in the time domain. In some embodiments, m may represent the index of subcarriers (i.e., m=1 indexes a stream that is transmitted first, e.g., by a first subcarrier and m=2 indexes a stream that is transmitted second by a second, possibly different, subcarrier). All S streams $x_1[m]$ through $x_S[m]$ may be collectively referred to as a S×1 stream vector x(m) such that:

$$x(m)=[x_1[m], \ldots, x_S[m]]^T.$$

Streams $x_1[m]$ through $x_S[m]$ may be input into MIMO precoder 150. MIMO precoder 150 may map stream $x_1[m]$ through $x_S[m]$ to transmit values $\tilde{x}_1[m]$ through $\tilde{x}_T[m]$, where T is the number of transmit antennas (T≧S). These transmit values may be grouped in a T×1 vector $\tilde{x}(m)$, which will be referred to hereinafter as transmit vector $\tilde{x}(m)$ where:

$$\tilde{x}(m)=[\tilde{x}_1[m], \ldots, \tilde{x}_T[m]]^T.$$

This mapping from stream vector x to transmit vector $\tilde{x}$ may be performed using a linear precoding operation. For example, MIMO precoder 150 may generate transmit vector $\tilde{x}$ by multiplying stream vector $\tilde{x}$ by a T×S precoding matrix P, such that:

$$\tilde{x}(m)=P(m)x(m). \quad (\text{EQ. 1a})$$

Precoding matrix P may be chosen to implement certain transmission schemes. In some embodiments, precoding matrix P may be selected such that multiple copies of the same data stream $x_1[m]$ are sent across a number of transmit antennas to improve the reliability of data transfer. This redundancy results in a higher chance of being able to use one or more of the received copies to reconstruct the transmitted signals at the receiver.

Transmit values $\tilde{x}_1[m]$ through $\tilde{x}_T[m]$ may be transmitted using T transmit antennas through channel 160 and received by R receiver antennas at receiver 180. For example, $\tilde{x}_1[m]$ may be transmitted through transmit antenna 152. During transmission, $\tilde{x}_1[m]$ through $\tilde{x}_T[m]$ may be altered by a transmission medium, represented by channel 160, and additive noise sources $z_1[m]$ through $z_R[m]$. In a wireless communication system channel 160 may be the physical space between the transmit and receiver antennas, which obstructs and attenuates the transmitted signals due to at least time varying multipath fades and shadowing effects. Additive noise sources $z_1[m]$ through $z_R[m]$ may, for example, be ambient electromagnetic interference. In some scenarios, noise sources $z_1[m]$ through $z_R[m]$ may be modeled as additive white Gaussian noise (AWGN) with zero mean. Also, in many applications, channel 160 may be time invariant, meaning that the properties of the channel do not substantially change over an appropriate time scale. In real time data transmission systems, an appropriate time scale may be in the millisecond range.

Receiver 180 may receive signals $y_1[m]$ through $y_R[m]$ using R receiver antennas such as receiver antenna 182. These received signals will be collectively referred to as the $m^{th}$ received vector y(m), or simply the received vector y, where:

$$y(m)=[y_1[m], \ldots, y_R[m]]^T.$$

Receiver 180 may include any suitable number of receiver antennas, and therefore R may be any integer of at least S. Signals $y_1[m]$ through $y_R[m]$ may include information from one or more of signals $\tilde{x}_1[m]$ through $\tilde{x}_T[m]$ that have been attenuated and/or corrupted by channel 160 and noise sources $z_1[m]$ through $z_R[m]$. Receiver 180 may process the received signals to produce output bit sequence 191. The processing done by receiver 180 may include demodulation and decoding. Alternatively, output bit sequence 191 may be directed to a decoder (not shown) external to receiver 180.

Because of the multiple transmit antennas of transmitter 110 and the possibly multiple receiver antennas of receiver 180, channel 160 may sometimes be referred to as a MIMO channel with T inputs (from transmitter 110) and R outputs (to receiver 180), or simply a T×R MIMO channel. Due to channel properties, the signal received by each of the R receiver antennas may be based on signals from multiple transmit antennas. In particular, a signal received by each receiver antenna may be a linear combination of the signals provided by the transmit antennas. Thus, in matrix form, the $m^{th}$ received vector r(m) can be modeled by:

$$y(m)=\tilde{H}(m)\tilde{x}(m)+z(m), m=1, \ldots, M, \quad (\text{EQ. 1b})$$

where M is the total number of received coded symbol vectors, y is the R×1 received vector representing the signals received by the R receiver antennas of receiver 180, and $\tilde{H}$ is a T×R matrix representing the effect of channel 160 on transmit vector $\tilde{x}$, and may sometimes be referred to as a channel response matrix. Vector $\tilde{x}$ is a T×1 vector containing the transmit values transmitted by the T transmit antennas of transmitter 110, and z is an R×1 signal vector representing additive noise, where $z(m)=[z_1[m], \ldots, z_R[m]]^T$.

Substituting EQ. 1a into EQ. 1b, one can compute an effective transmission channel relating the stream vector x to the received vector y as follows:

$$y(m)=\tilde{H}(m)P(m)x(m)+z(m)=H(m)x(m)+z(m), \quad (\text{EQ. 2})$$

where $\tilde{H}(m)$ represents the actual channel characteristics used in channel 160 and $H(m)=\tilde{H}(m)P(m)=[h_1[m], \ldots, h_S[m]]$ is a R×S matrix representing the effective transmission channel as modified by precoder 150. In some embodiments, the precoding matrix P can be chosen such that an effective transmission channel H(m) is created that maximizes the diversity gain of the system. For example, precoding matrix P may be chosen to change the apparent characteristics of the channel so that the effective channel matrix is more orthogonal than the actual channel matrix. Precoding matrix P may be a Givens rotation matrix, a Vandermonde matrix, a Fourier matrix, a Hadamard matrix or another type of matrix.

Each codeword, e.g., codeword 112, may be mapped to a set of streams $x_{i_1}[m]$ through $x_{i_{c(i)}}[m]$ (where c(i) denotes the total number of streams corresponding to codeword i, 1≦c(i)≦S). In other words, an $i^{th}$ codeword (equivalently codeword i, or codeword associated with index i) may be associated with a set of stream indices $S_i=\{i_1, i_2, \ldots, i_{c(i)}\}$, such that the stream vector $x_i(m)$ coming from the $i^{th}$ codeword is expressed as:

$$x_i(m)=[x_{i_1}[m], \ldots, x_{i_{c(i)}}[m]]^T.$$

Similarly, the channels corresponding to the $i^{th}$ codeword (alternatively codeword i) may be expressed using stream indices from the stream set $S_i$ as follows:

$$H_i(m) = [h_{i_1}[m], \ldots, h_{i_{c(i)}}[m]].$$

In some embodiments, transmitter 110 and receiver 180 may employ a retransmission protocol that allows transmitter 110 to transmit the same information to receiver 180 multiple times. For example, transmitter 110 and receiver 180 may employ an automatic repeat request (ARQ) or hybrid automatic repeat request (HARQ) scheme. When an ARQ or HARQ scheme is used, receiver 180 may include back channel transmitter 115. Transmitter 115 may be operable to send acknowledgement signals back to transmitter 110 through backchannel 107. An affirmative acknowledgement signal may be sent by transmitter 115 in response to a successful transmission, while a negative or no acknowledgement signal may be sent if a transmission is not successful. A successful transmission is one where the received signal y is reconstructed and accepted by receiver 180. Receiver 180 may accept reconstructed information when, for example, it does not detect any errors (e.g., from a CRC check) in the reconstructed information. The reconstruction process may include decoding, diversity combining, signal processing, another technique or a combination thereof.

While the present invention is described primarily with respect to ARQ and HARQ retransmission protocols, other retransmission protocols may also be used. For example, a transmission system may employ a repetition coding and transmission protocol, where a fixed number of retransmissions are sent for every data packet that is transmitted irrespective of the number of transmissions needed by the receiver. In this case, because retransmission requests may not be needed to implement the retransmission protocol, transmitter 115 may not be needed.

A transmission may be defined as a Transmission Time Interval (TTI) and a transmission time t may be defined as the index of a particular TTI. In an exemplary Long Term Evolution (LTE) implementation, a subframe may correspond to a TTI for the Physical Downlink Shared Channel (PDSCH), and transmission time t may correspond to an identifier of the subframe (i.e., t=Subframe_ID). From a plurality of C codewords transmitted at a transmission time t, each codeword of the C codewords may have been transmitted by transmitter 110 a different number of transmission attempts $k_i$. For example, a transmission time t may correspond to a second transmission attempt of codeword 1 ($k_1=2$) and a first transmission attempt of codeword 2 ($k_2=1$). The transmission time t corresponding to the $k_i^{th}$ transmission attempt of codeword i may be expressed using function $t_i(\ )$ as follows:

$$t = t_i(k_i).$$

In the following description, the transmission time t may sometimes be omitted to simplify the notation.

The system model of EQ. 2 may be extended to account for the retransmission capabilities of MIMO system 100 as follows:

$$y(m) = H(m)x(m) + z(m) = \sum_{i=1}^{C} H_i^{(k_i)}(m) x_i^{(k_i)}(m) + z(m);$$

$$m = 1 \ldots M(t),$$

where M(t) is the total number of received coded symbol vectors at transmission time t (e.g., the $t^{th}$ TTI), y is the R×1 received vector representing the signals received by the R receiver antennas of receiver 180 at a receiving time corresponding to transmission time t, and z is an R×1 signal vector representing additive noise with noise variance $\sigma^{(t)2}$ associated with transmission time t. Channel H is a T×R matrix representing the effect of channel 160 on transmit vector x. Channel H may be expressed using channel components $H_i^{(k_i)}$ (i=1, ..., C), where each channel component $H_i^{(k_i)}$ represents the portion of channel H corresponding to codeword i under its $k_i^{th}$ transmission attempt at time t. Channel may also be expressed using channel components $h_s(m;t)$ (s=1, ..., S), where each channel component $h_s(m;t)$ represents the portion of channel H corresponding to stream s transmitted at transmission time t. Both representations of channel H are shown in the following:

$$H(m;t) = H(m) = [H_1^{(k_1)}(m) \ldots H_C^{(k_1)}(m)] = [h_1(m;t) \ldots h_S(m;t)].$$

Vector x is a T×1 vector containing the transmit values transmitted by the T transmit antennas of transmitter 110 at transmission time t as follows:

$$x(m;t) = x(m) = [(x_1^{(k_1)}(m))^T \ldots (x_C^{(k_C)}(m))^T]^T.$$

At the transmission time t, each transmit value $x_i^{(k_i)}$ may correspond to a transmission attempt $k_i$. In the following description and for purposes of illustration, x(m;t) may be simply denoted as x(m) or x.

The same transmit values may be transmitted during multiple transmission attempts of a same codeword. Alternatively, different transmit values may be transmitted. For example, a transmit value $x_i^{(k)}(m)$ of a codeword i transmitted during transmission attempt k may be different from a transmit value $x_i^{(j)}(m)$ of the same codeword i transmitted during another transmission attempt j. This is the case, for example, when incremental redundancy (IR HARQ) is used in successive transmissions.

One technique for improving the performance of a MIMO system, e.g., of system 100 of FIG. 1, is to use successive interference cancellation (SIC). According to this technique, a codeword associated with strong channel conditions may be decoded first before other codewords associated with weaker channel conditions. Effects of this decoded codeword may be subtracted from a received signal vector, e.g., received vector y of FIG. 1, to eliminate interference of the decoded codeword on the other codewords.

SIC can be implemented in a number of ways. For example, SIC can be implemented such that all codewords are decoded in parallel, such that one codeword is serially decoded at each stage, or such that any arbitrary number of codewords is decoded simultaneously at each stage. Techniques for implementing SIC are described, for example, in co-pending, commonly-assigned U.S. patent application Ser. No. 13/047,056, entitled "MULTIPLE-INPUT MULTIPLE-OUTPUT RECEIVERS USING SUCCESSIVE INTERFERENCE CANCELLATION BASED ON CYCLE REDUNDANCY CHECK", filed Apr. 2, 2010, which is hereby incorporated by reference herein in its entirety. Hereafter, and for the purposes of illustration, this disclosure will primarily discuss the serial SIC implementation. The systems and methods of this disclosure, however, may apply to other implementations of SIC. For example, any SIC implementation (e.g., serial or parallel) may use the SIC ordering generated using the techniques described herein.

Figure 2:
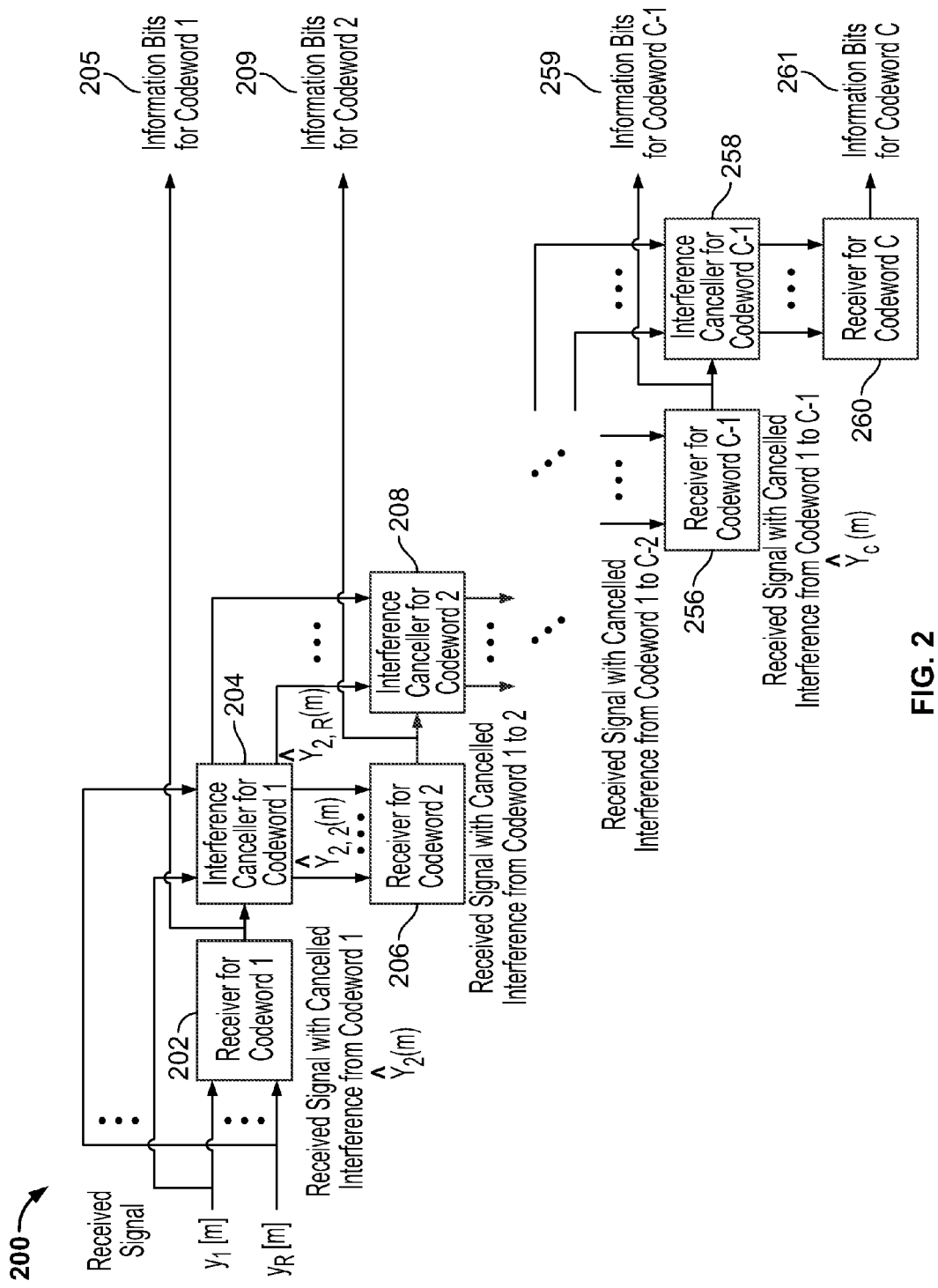
FIG. 2 is a high level block diagram of a successive interference cancellation (SIC) system, in accordance with some embodiments of the present disclosure.

FIG. 2 illustrates a block diagram of system 200 for performing SIC according to some embodiments. System 200 may include C decoding stages 1, 2, ..., C for respectively decoding codewords $L_1, L_2, \ldots, L_C$. For ease of illustration, only 4 of the stages are shown, and the stages are chosen to correspond, respectively, to codewords 1, 2, . . . , C in that order (i.e., $L_1=1$, $L_2=2$, . . . , $L_C=C$). However, any desired ordering of codewords may be used, as will be explained in further detail below.

Each stage (except the last stage) may include a receiver block for a codeword i and an interference canceller associated with that codeword i. For example, receiver block 202 and interference canceller 204 may correspond to the first stage associated with codeword 1, receiver block 206 and interference canceller 208 may correspond to the second stage associated with codeword 2, and receiver block 256 and interference canceller 258 may correspond to the C–1$^{th}$ stage associated with codeword C–1. The last stage may include a receiver block associated with codeword C and no interference canceller block, for example, receiver block 260. Although the receiver and interference canceller blocks of FIG. 2 are illustrated as separate blocks, these blocks may be implemented as one or multiple components by a single or multiple integrated circuit boards or devices.

At the first stage, receiver 202 may decode codeword 1 based on a received signal vector y, e.g., received signal vector y from FIG. 1, to generate decoded codeword 1. Interference canceller 204 may receive received signal vector y as well as the decoded codeword 1, as output by receiver 202. Interference canceller 204 may generate an interference-free received signal vector $\hat{y}_2$, where the interference due to codeword 1 is cancelled.

At the second stage, receiver 206 may decode codeword 2 based on the interference-free received signal vector $\hat{y}_2$ to generate decoded codeword 2. Interference canceller 208 may also receive $\hat{y}_2$ from interference canceller 204 as well as the decoded codeword 2 output by receiver 206. Interference canceller 208 may generate an interference-free received signal vector $\hat{y}_3$, where the interferences due to codewords 1 and 2 are cancelled by removing the effect of codeword 2 from the interference-free received signal vector $\hat{y}_2$.

Similarly to the second stage, a receiver block at an SIC stage i (i=3, . . . , C–1) may decode a codeword i based on an interference-free received signal vector $\hat{y}_i$. An interference canceller may output an interference-free received signal vector $\hat{y}_{i+1}$, where the interferences due to codewords 1 through i are cancelled.

At the last stage, receiver block 260 may decode codeword C based on interference-free received signal vector $\hat{y}_C$ as output by interference canceller 258 of stage C–1.

Figure 3:
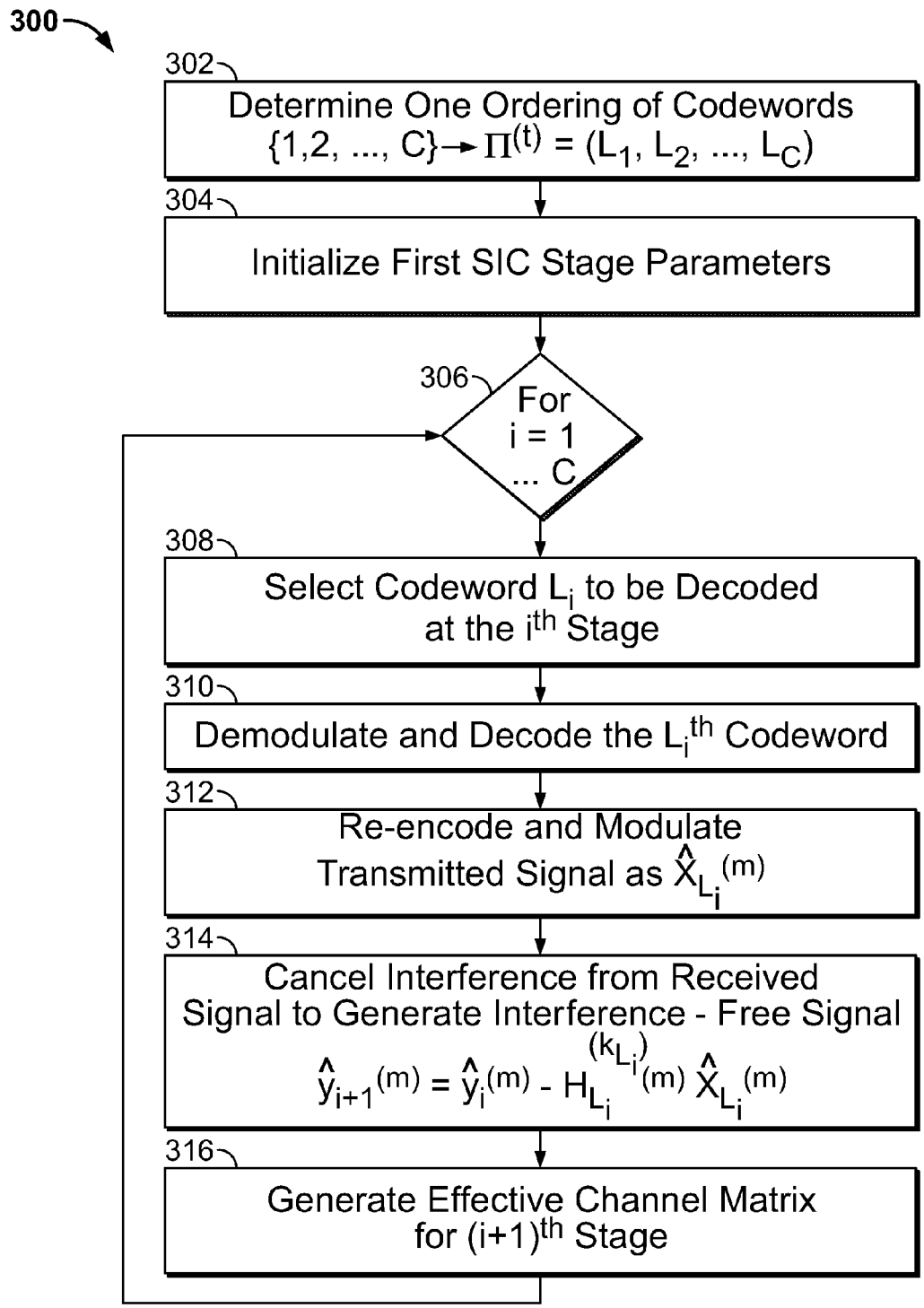
FIG. 3 is a flow diagram illustrating a process for performing SIC, in accordance with some embodiments of the present disclosure.

One example of a SIC process that can be implemented in receiver and interference canceller blocks of FIG. 2 is illustrated in FIG. 3. FIG. 3 is a flow diagram illustrating process 300 for performing SIC at a transmission time t using an exemplary codeword ordering $(L_1, L_2, . . . , L_C)$. Process 300 includes 302, 304, 306, 308, 310, 312, 314, and 316. Process 300 includes 302, 304, 306, 308, 310, 312, 314, and 316. In some embodiments, 310 may be implemented in receiver blocks of FIGS. 2 and 312, 314, and 316 may be implemented in interference canceller blocks of FIG. 2.

At 302, an ordering for decoding codewords in respective stages of the SIC process at a transmission time t is determined. This ordering may be represented mathematically as follows:

$$\{1, 2, \ldots, C\} \rightarrow \Pi^{(t)} = (L_1, L_2, \ldots, L_C). \tag{EQ. 3}$$

In other words, the C codewords (e.g., codewords 101 through 105 of FIG. 1) are mapped to an ordered C-tuple or ordering Π. The tuple Π defines the order in which the codewords may be decoded at each SIC stage i (i=1, . . . , C). In the example illustrated in FIG. 2, codewords 1 through C were decoded in that order (i.e., $L_i$=i). However, any suitable ordering Π may be used. Techniques for determining SIC decoding ordering are described, for example, in co-pending, commonly-assigned U.S. patent application Ser. No. 13/164,111, entitled "METHODS AND APPARATUS FOR MULTIPLE INPUT MULTIPLE OUTPUT (MIMO) SUCCESSIVE INTERFERENCE CANCELLATION (SIC)", filed Jun. 20, 2011, which is hereby incorporated by reference herein in its entirety.

At 304, parameters for process 300 may be initialized. For example, the interference-free received signal vector $\hat{y}_1$ used by the first stage (e.g., received by the interference cancellation block 204 of FIG. 2) may be initialized to the received signal vector y. In addition, the effective channel matrix $\hat{H}_1$ for the first stage (e.g., used by the receiver 202 and/or interference canceller 204 of FIG. 2) may be initialized to the effective channel matrix H (e.g., effective channel 130 of FIG. 1).

At 306, it is determined whether all C codewords have been decoded. If all codewords have been decoded (i.e., i>C), process 300 may be terminated. Otherwise, if there is any codeword still undecoded (i.e., 1≤i≤C), the codeword may be decoded using 308, 310, 312, 314, and 316. Each iteration for decoding one codeword may correspond to one SIC stage.

At 308, a codeword to be decoded at SIC stage i is selected. For example, the codeword i to be decoded at SIC stage i may be determined to be $L_i$, as defined by the ordering generated at 302.

At 310, the codeword selected at 308, e.g., the $L_i^{th}$ codeword, may be demodulated and/or decoded based on the interference-free signal received at the i$^{th}$ stage, and the SIC-adjusted effective channel matrix at the i$^{th}$ stage, $\hat{H}_i$.

This effective channel matrix corresponds to the composite channels for the codewords that have not been decoded at the i–1$^{th}$ stage, i.e., $\hat{H}_i = [H_{L_i}, \ldots, H_{L_C}]$. The specific demodulation and decoding methods used at 310 may depend on the receiver implementation.

At 312, the transmitted signal vector is re-encoded and modulated to generate reconstructed transmitted signal vector $\hat{x}_{L_i}$ that takes into account the interference cancellation due to the $L_i^{th}$ codeword. This reconstructed vector may also be known as a feedback signal.

At 314, the interference-free received signal vector $\hat{y}_{i+i}$ for stage i+1 is generated by cancelling the interference from the interference-free received signal vector $\hat{y}_i$ for stage i. This may be done by subtracting the effect of the reconstructed transmitted signal vector $\hat{x}_{L_i}$ (i.e., as modified by the channels $$\hat{H}_{L_i}^{(k_{L_i})}(m)$$

corresponding to codeword $L_i$) from the interference-free received signal vector $\hat{y}_i$:

$$\hat{y}_{i+1}(m) = \hat{y}_i(m) - \hat{H}_{L_i}^{(k_{L_i})}(m)\hat{x}_{L_i}(m).$$

At 316, the effective channel for the (i+1)$^{th}$ stage, $\hat{H}_{i+1}$ may be generated. For example, $\hat{H}_{i+1}$ may be generated by deleting the columns corresponding to the channels for the $L_i^{th}$ codeword as follows:

$$\hat{H}_{i+1}(m) = \hat{H}_i(m) \setminus H_{L_i}^{(k_{L_i})}(m),$$

where A\B denotes the deletion of columns of the matrix B from the matrix A.

Next, 306 may be checked again. The next codeword, $L_{i+1}$, may be decoded next (i.e., i is incremented to i+1), unless all codewords have been decoded, in which case process 300 may be terminated.

Although process 300 describes SIC using iterative stages, this is meant to be illustrative and is not meant to be limiting or exhaustive. The methods and processes described herein generally apply to other representations of SIC, including QR representation.

Figure 4:
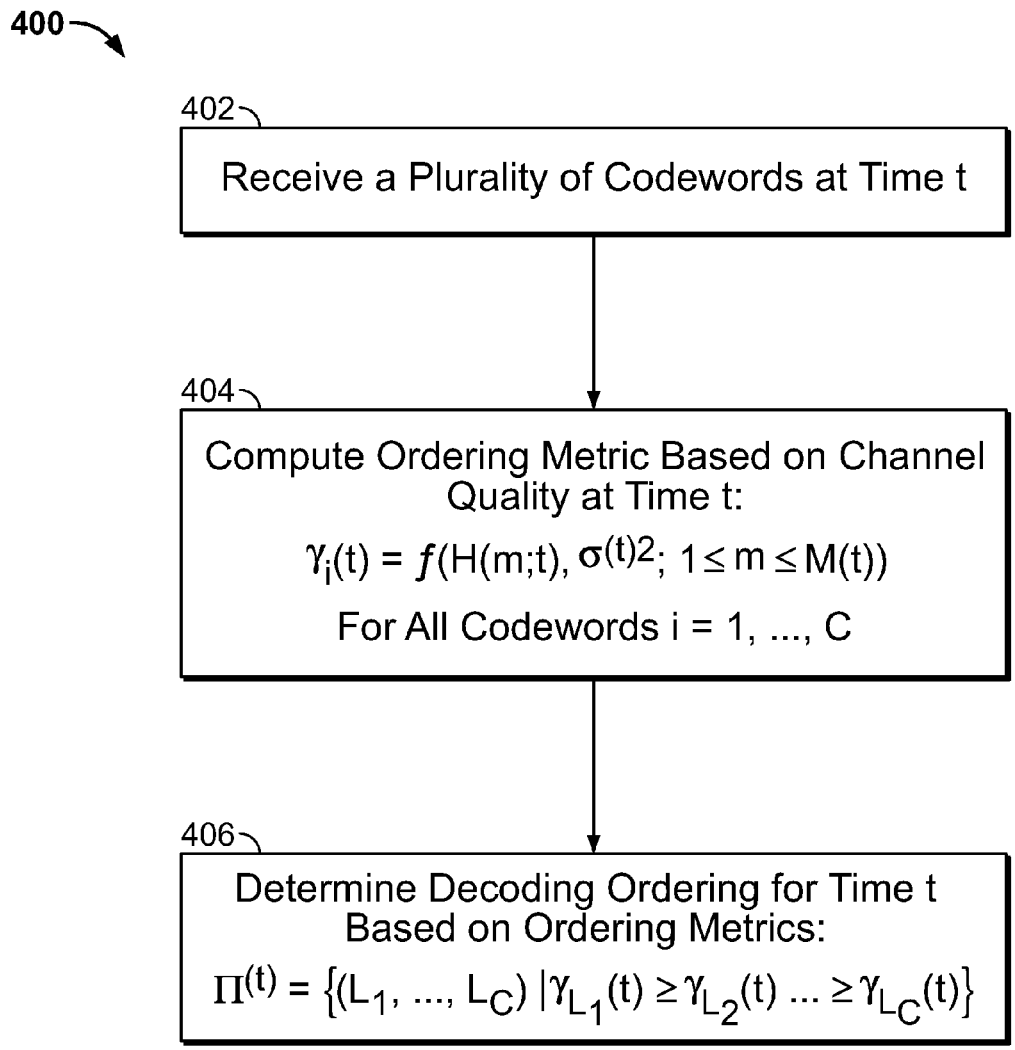
FIG. 4 illustrates a process for determining a SIC ordering based on channels associated with a transmission time t, in accordance with some embodiments of the present disclosure.

FIG. 4 illustrates process 400 for determining a SIC ordering based on channels associated with a transmission time t in accordance with some embodiments. Process 400 includes 402, 404, and 406 and may be implemented in processing circuitry of receiver 180 of FIG. 1 or receiver/interference cancellation blocks of FIG. 2.

At 402, a plurality of codewords is received. These codewords may be transmitted at a transmission time t. In some embodiments, a transmission time t may be defined as an index of a particular transmission time interval (TTI). For example, a subframe may correspond to a TTI for the Physical Downlink Shared Channel (PDSCH) of an LTE implementation, and transmission time t may correspond to an identifier of that subframe (i.e., t=Subframe_ID).

At 404, an ordering metric $\gamma_i(t)$ is computed for each codeword i of the received codewords that have been transmitted at transmission time t. This ordering metric may be determined based on a channel quality associated with codeword i at the transmission time t. In some embodiments, e.g., when MIMO system 100 does not implement a retransmission protocol, or when receiver 180 does not consider previous transmissions of currently received codewords, the ordering metric may not consider any previous transmission times associated with previous transmission attempts of codeword i. Such an approach will be referred to herein as a history-free SIC ordering approach. For example, ordering metric $\gamma_1(t)$ may be computed for channels associated with transmission time t as follows:

$$\gamma_i(t) = f(H(m;t), \sigma^{(o)2}; 1 \leq m \leq M(t)); 1 \leq i \leq C, \quad \text{(EQ. 4)}$$

where function f maps effective channel H over M(t) coded symbol vectors of codeword i to a channel quality using, e.g., a specific performance metric. Any suitable performance metric may be used, such as the Minimum Mean Square Error (MMSE) criterion or the Zero Forcing (ZF) criterion.

In some embodiments, the ordering metric for codeword i transmitted at transmission time t may be computed based on the average channel gain for codeword i as follows:

$$\gamma_i(t) = \frac{1}{M(t)|S_i|} \sum_{s \in S_i} \sum_{m=1}^{M(t)} \|h_s(m;t)\|^2 \quad \text{(EQ. 5)}$$

$$1 \leq i \leq C,$$

where $|h_s(m;t)|$ is the norm of the channel corresponding to a stream s in the stream set $S_i$ of codeword i at transmission time t. Channel norms $\|h_s\|$ are averaged over all streams corresponding to codeword i (i.e., all streams s in stream set $S_i$) and over all received coded symbol vectors of codeword i (i.e., symbols m=1, . . . , M(t)) to compute the ordering metric $\gamma_i(t)$.

At 406, an ordering $\Pi^{(t)}$ from the computed ordering metrics $\gamma_i(t)$ is determined. This ordering may be represented as:

$$\Pi = (L_1, L_2, \ldots, L_C),$$

where $L_i$ (i=1, . . . , C) is the $i^{th}$ codeword to decode in that particular ordering $\Pi^{(t)}$. In some embodiments, the ordering defined in $\Pi^{(t)}$ may be determined from sorting the codewords based on their ordering metrics $\gamma_i(t)$ from highest to lowest. This may be represented as:

$$\Pi^{(t)} = \{(L_1, L_2, \ldots, L_C) | \gamma_{L_1} \geq \ldots \geq \gamma_{L_C}\}. \quad \text{(EQ. 6)}$$

As explained above, a history-free SIC ordering may be determined based on channel qualities associated with a current transmission time t without accounting for previous transmission attempts of retransmitted codewords. However, limiting the SIC ordering to the channel qualities at the receiving time only (e.g., corresponding to a current transmission time t) may cause degradation of performance in a system with retransmissions. This is because channel qualities associated with previous transmission attempts may impact the order of codewords to decode during a current transmission attempt. For example, during the current transmission time t, a retransmitted codeword n associated with weak channel conditions may have a better decoding opportunity than another codeword m associated with stronger channel qualities and that has not been previously transmitted. Accordingly, and according to aspects of this disclosure, a SIC ordering may be determined that takes into account previous transmission attempts of codewords transmitted during the current transmission time t. Such a SIC ordering will be referred to herein as history-aware SIC ordering. By recognizing that a codeword's opportunity of successful decoding may depend not only on channels at a current transmission time but also on channels at previous transmission times corresponding to previous transmission attempts, a SIC ordering may achieve a better performance. Various kinds of performance criteria can be used to assess channel qualities associated with each codeword. Examples of such channel qualities include, but are not limited, to packet error rate (PER), Signal-to-Noise ratio (SNR), Signal-to-Interference and Noise Ratio (SINR), and/or achievable data-rate. Embodiments of history-aware SIC ordering processes will be described in further detail below.

Figure 5:
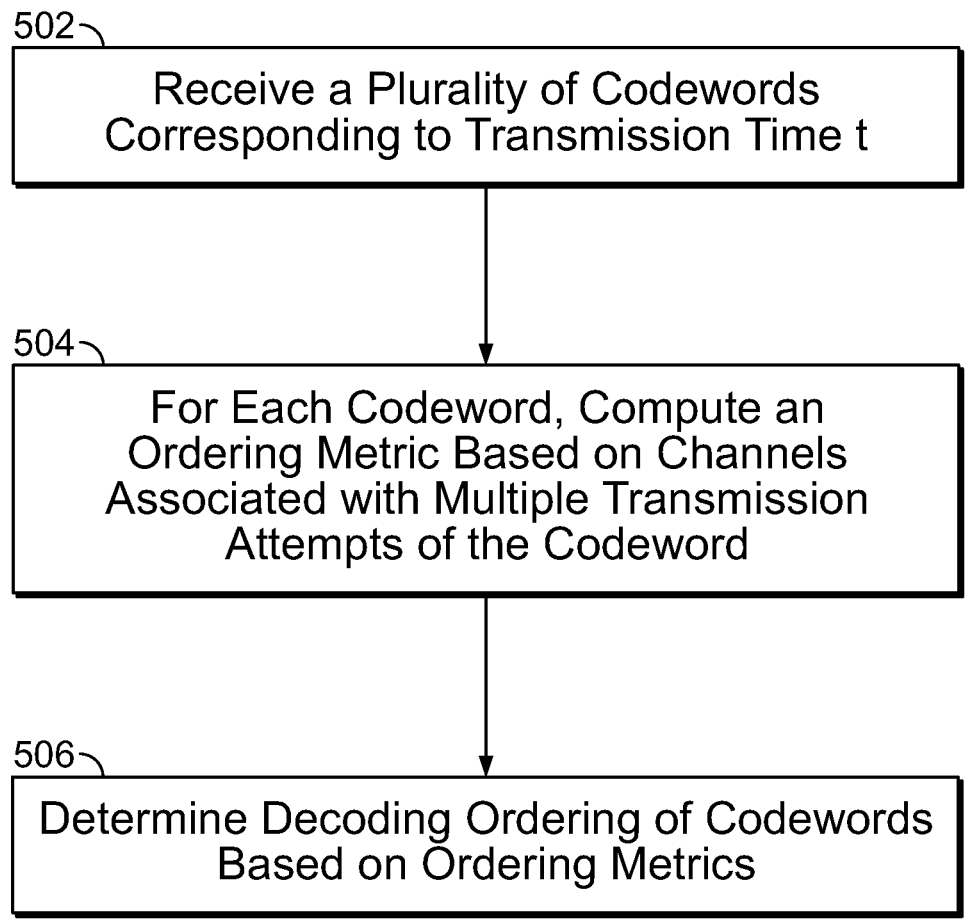
FIG. 5 is a flow diagram illustrating a process for determining a history-aware SIC ordering based on channels associated with at least one previous transmission attempt of a currently received codeword, in accordance with some embodiments of the present disclosure.

FIG. 5 is a flow diagram illustrating process 500 for determining a history-aware SIC ordering based on channels associated with at least one previous transmission attempt of a currently received codeword, in accordance with embodiments of the present disclosure. Process 500 includes 502, 504, and 506, and may be implemented in processing circuitry of receiver 180 of FIG. 1 or receiver/interference cancellation blocks of FIG. 2.

At 502, a plurality of codewords may be received that have been transmitted at transmission time t. This may be done similarly to 402 of FIG. 4 above.

At 504, an ordering metric $\gamma_i(t)$ is computed for each codeword i of the plurality of codewords received at 502. The ordering metric $\gamma_i(t)$ may be based on channels corresponding to multiple transmission times associated, respectively, with multiple transmission attempts of codeword i. For example, the ordering metric $\gamma_i(t)$ may be based on channels associated with all transmission times $\tau = t_i(1), \ldots, t_i(k_i)$, where $t_i(1)$ represents the transmission time of the first transmission attempt of codeword i and $t_i(k_i)$ represents the transmission time of the last transmission attempt of codeword i at a current (or last) transmission time t (i.e., $t=t_i(k_i)$). This may be represented as follows:

$$\gamma_i(t)=f(H(m;\tau),\sigma^{(\tau)2};1\leq m\leq M(\tau),\tau=t_i(1)\ldots t_i(k_i));$$
$$1\leq i\leq C, \quad (EQ. 7)$$

where the channel $H(m;\tau)$ represents the channel associated with the coded symbol vectors m for codeword i ($m=1, \ldots, M(\tau)$) transmitted at a transmission time $\tau$ and $\sigma^{(\tau)2}$ is the noise variance associated with the transmission channel at transmission time $\tau$. Mapping function f may use any suitable performance criterion, such as predicted PER, SNR, and/or SINR.

Although EQ. 7 considers all transmission times $T= t_i(1), \ldots, t_i(k_i)$, starting from the first transmission attempt of codeword i through the last transmission attempt of codeword i, any appropriate subset of $\tau$ may be used in the computation of the ordering metric $\gamma_i(t)$. For example, only a last number of transmission attempts may be used.

At 506, a decoding ordering $\Pi^{(t)}$ is determined based on the ordering metrics computed at 504. In some embodiments, the ordering $\Pi^{(t)}$ to be used for codewords associated with transmission time t may be determined from sorting the codewords based on their ordering metrics $\gamma_i(t)$. For example, the first codeword to be decoded using SIC, $L_1$, may have the highest ordering metric $\gamma_{L_1}$ and the second codeword to be decoded using SIC, $L_2$, may have the second highest ordering metric $\gamma_{L_2}$, and so on, as follows:

$$\Pi^{(t)}=\{(L_1,L_2,\ldots,L_C)|\gamma_{L_1}\geq\ldots\geq\gamma_{L_C}\}.$$

In some embodiments, an ordering metric for a codeword may be computed using a probability that an error occurred in the received codeword. This probability may be evaluated using a packet error rate (PER), which may be calculated as the number of erroneously received data packets divided by the total number of received packets. In some embodiments, instead of decoding all codewords in a SIC ordering and computing the PER for each decoded codeword in that ordering based on channel qualities of all transmission attempts of the codeword, PER may be predicted from the channel information. An example of this is shown in FIG. 6 below.

Figure 6:
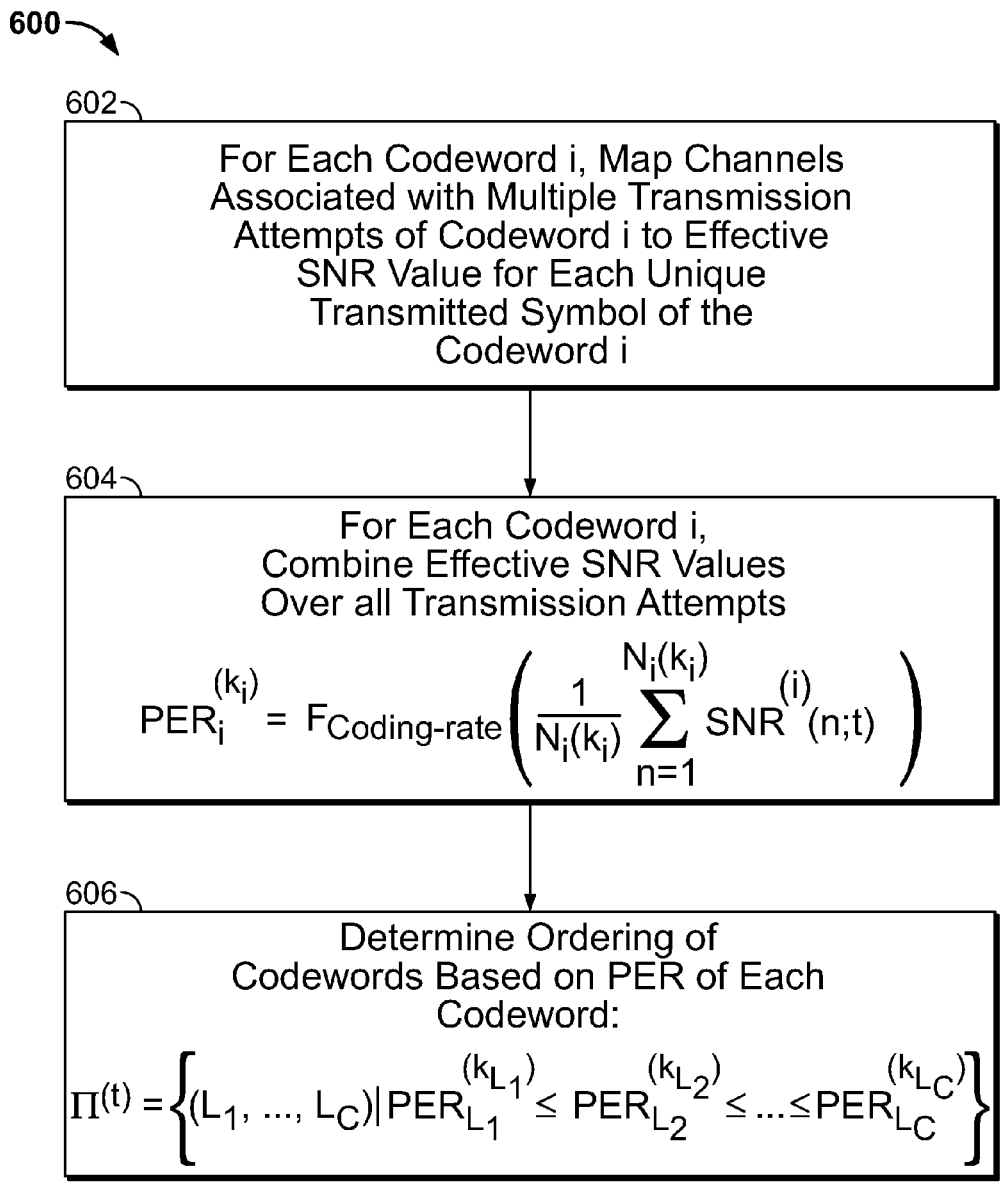
FIG. 6 is a flow diagram illustrating a process for determining a history-aware SIC ordering based on predicted PER, in accordance with some embodiments of the present disclosure.

FIG. 6 is a flow diagram illustrating process 600 for determining a history-aware SIC ordering based on predicted PER associated with at least one previous transmission attempt of a currently received codeword, in accordance with embodiments of the present disclosure. Process 600 includes 602, 604, and 606, and may be implemented in processing circuitry of receiver 180 of FIG. 1 or receiver/interference cancellation blocks of FIG. 2.

At 602, and for each received codeword i that is transmitted at transmission time t, effective channels associated with multiple transmission attempts of codeword i (up to a current transmission attempt kJ may be mapped to effective SNR values corresponding to codeword i. For example, channels associated with codeword i over a plurality of transmission times corresponding to the first through the $k_i^{th}$ transmission attempt of codeword i may be mapped to an SNR value for each unique coded symbol associated with codeword i. This may be represented as follows:

$$\{H(m;\tau),\sigma^{(\tau)2};1\leq m\leq M(\tau),\tau=t_i(1)\ldots t_i(k_i)\}\rightarrow$$
$$\{SNR_{eff}^{(i)}(n;t);\ 1\leq n\leq N_i(k_i)\}, \quad (EQ. 8)$$

where $H(m;\tau)$ represents the effective channel associated with the $M(\tau)$ coded symbols for codeword i at transmission time $\tau$ ($\tau=t_i(1),\ldots,t_i(k_i)$) and $\sigma^{(\tau)2}$ is the noise variance associated with the transmission channel at transmission time $\tau$. $N_i(k_i)$ represents the total number of unique transmitted coded symbols of codeword i up to and including the $k_i^{th}$ transmission attempt. Specifically, during multiple transmission attempts of codeword i, the same transmitted coded symbol of codeword i may be repeated. $N_i(k_i)$ is the number of unique transmitted coded symbols among all transmitted coded symbols of codeword i up to and including the $k_i^{th}$ transmission attempt. For example, if there are two transmission attempts (i.e., $k_i=2$) of codeword i, such that coded symbols $\{s_1, s_2\}$ are transmitted in the first transmission and coded symbols $\{s_1, s_3\}$ are transmitted in the second transmission, then $N_i(k_i=2)$ is 3 because there are three unique transmitted coded symbols $s_1$, $s_2$, and $s_3$. The value $SNR^{(i)}(n;t)$ is the effective codeword SNR value per unique coded symbol n accumulated up to and including the $k_i^{th}$ transmission attempt associated with codeword i. In this determination of $SNR^{(i)}(n;t)$, the effective SNR values of repeated coded symbol vectors may be combined over all transmission attempts of codeword i to generate the SNR values associated with the unique coded symbols. Continuing the example above, the SNR for both occurrences of $s_1$ may be combined to compute one SNR value for $s_1$ (e.g., $SNR^{(i)}(s_1)=SNR(s_1;1)+SNR(s_1;2)$).

The particular mapping from the channels to the effective SNR values (e.g., of EQ. 8) may depend on the type of equalizer (e.g., MMSE), the error compensation method, the HARQ combining method, and/or the mapping method. Examples of the mapping method include, but are not limited to, finite alphabet capacity (FAC), mean mutual information per bit (MMIB), and exponential effective SNR mapping (EESM).

At 604, and for each codeword i ($1\leq i\leq C$), the effective SNR values computed at 602 are combined to generate a predicted PER value $P_i^{(k_i)}$ codeword i at transmission time t. The effective SNR values $SNR^{(i)}(n;t)$ per unique symbol n may be combined over all unique transmitted coded symbols of codeword i up to the transmission time t. For example, the effective SNR values $SNR^{(i)}(n;t)$ may be averaged over all unique coded symbols n (i.e., $n=1, \ldots, N_i(k_i)$), and the computed average effective codeword SNR may be mapped to the predicted PER value $P_1^{(k_i)}$ as follows:

$$P_i^{(k_i)} = F_{coding\text{-}rate}\left(\frac{1}{N_i(k_i)}\sum_{n=1}^{N_i(k_i)} SNR_{eff}^{(i)}(n;t)\right), \quad (EQ.\ 9)$$

where $F_{Coding\text{-}Rate}$ corresponds to a PER mapping function. In some embodiments, this function may be implemented using look-up tables that map various ranges of average effective codeword SNR values to PER values at different coding rates. These tables may be based on pre-collected statistics at different coding rates.

At 606, an ordering $\Pi^{(t)}$ may be determined based on the PER value for each codeword. For example, the codewords may be ordered in increasing order of their corresponding PER value as follows:

$$\Pi^{(t)} = \left\{(L_1,\ldots L_C)\left|P_{L_1}^{(k_{L_1})}\leq P_{L_2}^{(k_{L_2})}\leq\ldots\leq P_{L_C}^{(k_{L_C})}\right.\right\}.$$

This is similar to the ordering defined in EQ. 6, where the ordering metric $\gamma_i(t)$ is set to the probability of successful transmission of codeword i at transmission attempt $k_i$ (i.e., $\gamma_i=1-P_i^{(k_i)}$).

Figure 7A:
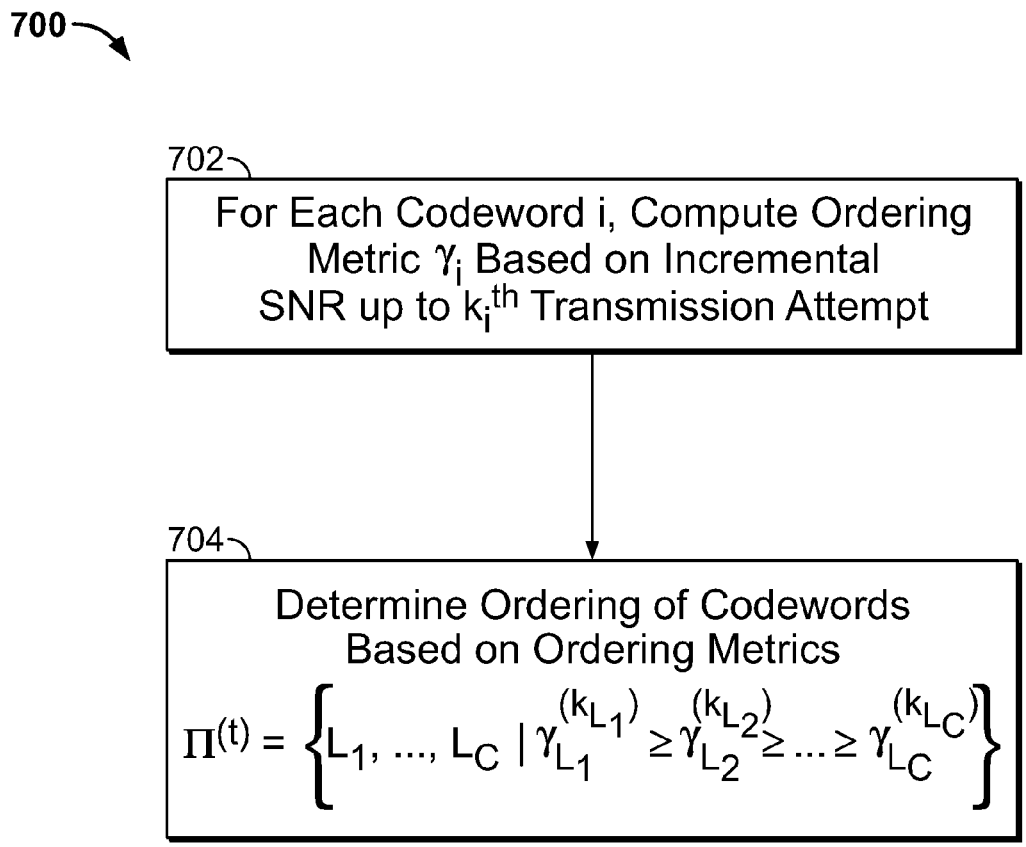
FIG. 7A is a flow diagram illustrating a process for determining a history-aware SIC ordering using incremental SNR, in accordance with some embodiments of the present disclosure.
Figure 7B:
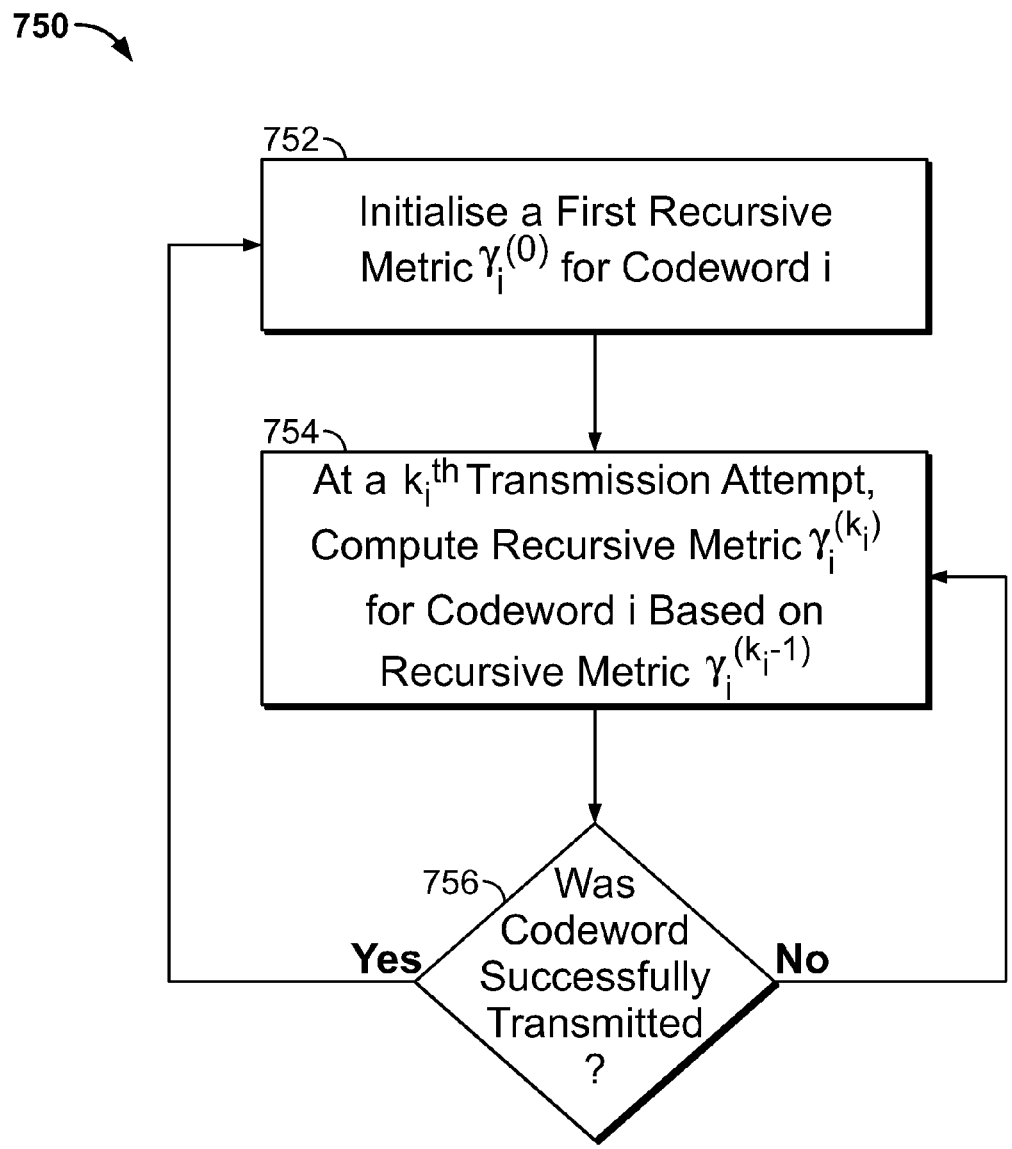
FIG. 7B is a flow diagram illustrating a process for recursively determining a history-aware SIC ordering based on a performance metric associated with at least one previous transmission attempt of a currently received codeword, in accordance with some embodiments of the present disclosure.
Figure 8A:
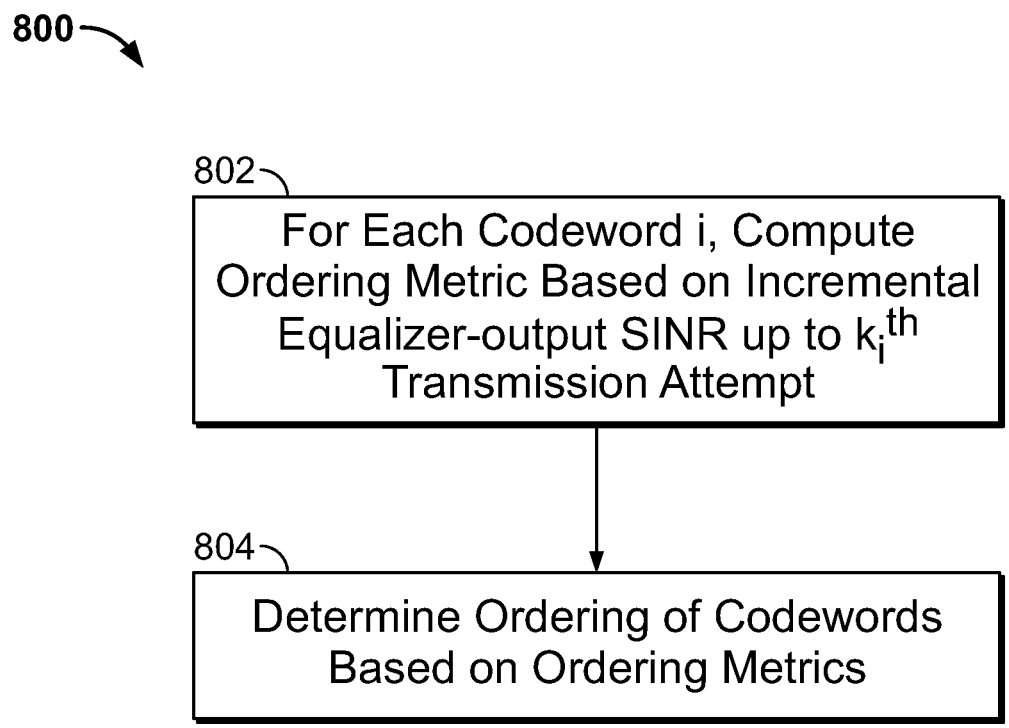
FIG. 8A is a flow diagram illustrating a process for determining a history-aware SIC ordering using incremental equalizer-output SINR, in accordance with some embodiments of the present disclosure.
Figure 8B:
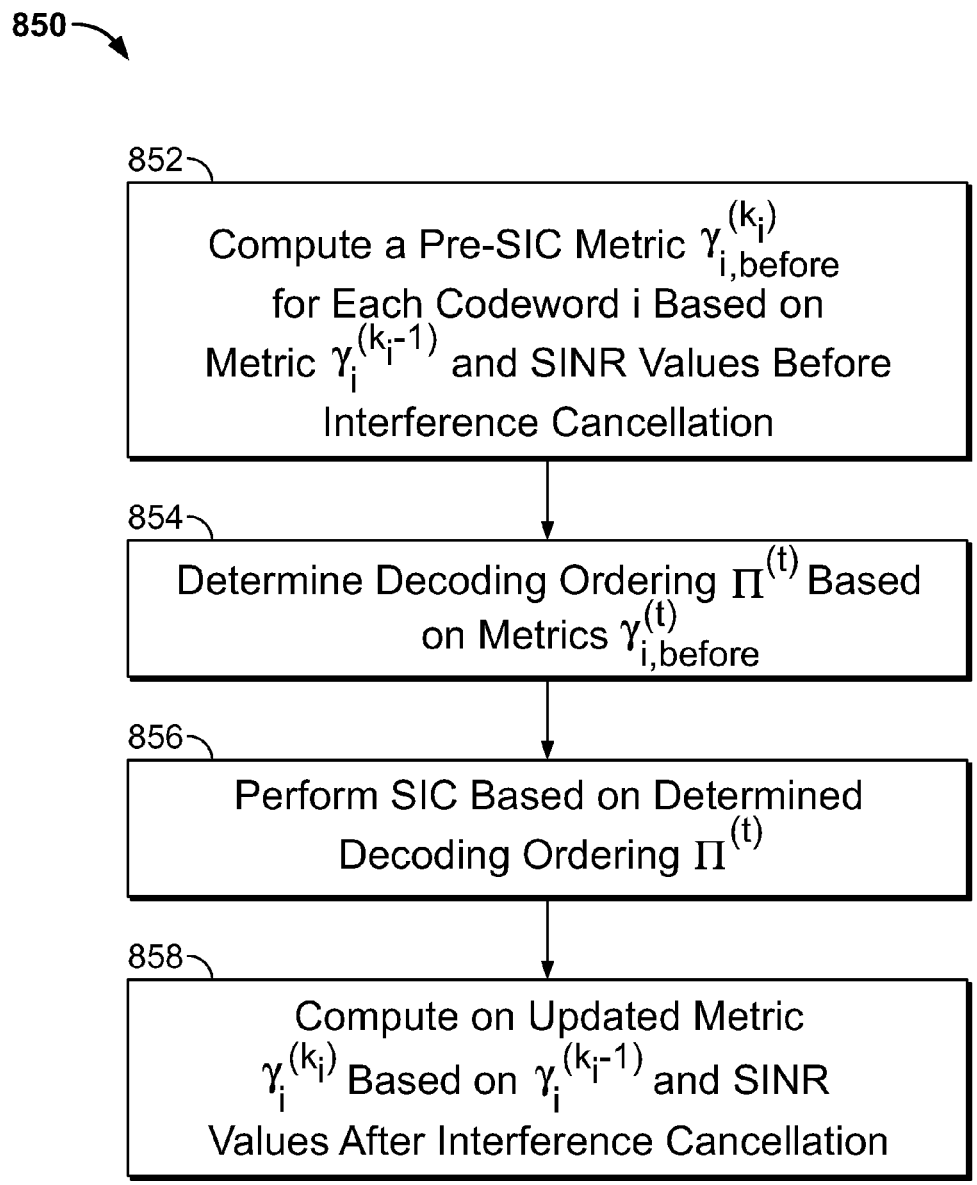
FIG. 8B is a flow diagram illustrating a process for recursively updating ordering metrics using the incremental SINR approach of FIG. 8A, in accordance with some embodiments of the present disclosure.

In some embodiments, PER may be difficult to estimate. This may be due to the high complexity of computing the SNR values corresponding to the various retransmissions (e.g., EQ. 8), and/or to the difficulty of obtaining precise PER statistics for each code rate (e.g., function $F_{Coding\text{-}Rate}$ of EQ. 9). A number of history-aware SIC ordering approaches may be used that approximate the PER for each codeword. An incremental SNR approach is illustrated in FIGS. 7A and 7B, where PER is represented using SNR (or channel gain). An incremental SINR approach is illustrated in FIGS. 8A and 8B, where PER is represented using equalizer-output SINR. These performance metrics (i.e., SNR and SINR) are merely illustrative, and any performance metric may be used, as appropriate, to measure the performance of a codeword.

FIG. 7A is a flow diagram illustrating process 700 for determining a history-aware SIC ordering using incremental SNR, in accordance with embodiments of the present disclosure. Process 700 includes 702 and 704, and may be implemented in processing circuitry of receiver 180 of FIG. 1 or receiver/interference cancellation blocks of FIG. 2.

At 702, for each codeword i that is transmitted at transmission time t, effective SNR values (or channel gains) associated with multiple transmission attempts of codeword i may be combined to generate an ordering metric. Various types of combinations may be used to combine these channel gains. For example, channel gains as described in EQ. 5 above may be added over the transmission times corresponding to the first through $k_i^{th}$ transmission attempt of codeword i (i.e., for transmission times $\tau = t_i(1), \ldots, t_i(k_i)$), as follows:

$$\gamma_i^{(k_i)} = \sum_{j=1}^{k_i}\left(\frac{1}{M(t_i(j))|S_i|}\sum_{s \in S_i}\sum_{m=1}^{M(t_i(j))}\frac{1}{\sigma^{(t_i(j))2}}\|h_s(m; t_i(j))\|^2\right), \quad \text{(EQ. 10)}$$

where the operand of the outer summation represents the channel gain associated with transmission times $t_i(j)$ of the $j^{th}$ transmission attempt. As shown in EQ. 10, these channel gains may be summed over all transmission attempts (j= 1, ..., $k_i$) of codeword i to compute the ordering metric $\gamma_i^{(k_i)}$ (equivalently, $\gamma_i(t)$ where $t = t_i(k_i)$).

Any combination function may be used at 702 to combine channel gains associated with the various transmission attempts of a received codeword. For example, instead of the linear sum shown in EQ. 10, a geometric sum may be used as follows:

$$\gamma_i^{(k_i)} = \sum_{j=1}^{k_i}\log_2\left(1 + \frac{1}{M(t_i(j))|S_i|}\sum_{s \in S_i}\sum_{m=1}^{M(t_i(j))}\frac{1}{\sigma^{(t_i(j))2}}\|h_s(m; t_i(j))\|^2\right). \quad \text{(EQ. 11)}$$

These combination functions are merely illustrative, and are not meant to be limiting or exhaustive in any way. Any combination function may be used to combine channel gains, as appropriate.

At 704, a decoding order $\Pi^{(t)}$ may be determined based on the ordering metrics for each codeword. For example, the decoding order may be determined by sorting the codewords based on their ordering metrics (i.e., the respective incremental channel gain) from highest to lowest, i.e., $$\Pi^{(t)} = \left\{L_1, \ldots L_C \,\middle|\, \gamma_{L_1}^{(k_{L_1})} \geq \gamma_{L_2}^{(k_{L_2})} \geq \ldots \geq \gamma_{L_C}^{(k_{L_C})}\right\}.$$

In some embodiments, the combination of performance metrics, e.g., the sum of SNR values in EQS. 10 or 11, may be computed iteratively at each transmission attempt. In some embodiments, this combination may be computed recursively, as shown in FIG. 7B below.

FIG. 7B is a flow diagram illustrating process 750 for recursively determining a history-aware SIC ordering based on a performance metric associated with at least one previous transmission attempt of a currently received codeword, in accordance with embodiments of the present disclosure. Processes 600 of FIG. 6 or 700 of FIG. 7A may be implemented in this way. Process 750 includes 752, 754, and 756, and may be implemented in processing circuitry of receiver 180 of FIG. 1 or receiver/interference cancellation blocks of FIG. 2.

At 752, a first recursive metric $\gamma_i^{(0)}$ may be initialized for each codeword i prior to a first transmission attempt of codeword i. For example, $\gamma_i^{(0)}$ may be set to 0.

At 754, at each $k_i^{th}$ transmission attempt of codeword i, a $k_i^{th}$ recursive metric $\gamma_i^{(k_i)}$ is computed based on the recursive metric $\gamma_i^{(k_i-1)}$ of the previous $(k_i-1)^{th}$ transmission attempt. In some embodiments, the recursive metric $\gamma_i^{(k_i)}$ may be computed by combining a channel quality associated with the $k_i^{th}$ transmission attempt with the recursive metric $y_i^{(k_i-1)}$, as follows:

$$\gamma_i^{(k_i)} = \gamma_i^{(k_i-1)} + f(H(m, t_i(k_i))); 1 \leq m \leq M(t)),$$

where f is a mapping function that computes a performance metric, e.g., SNR, based on the channel associated with the $k_i^{th}$ transmission attempt. This mapping function may be similar to the mapping function described in EQ. 7 above.

In some embodiments, the channel quality (e.g., $f(H(m, t_i(k_i))); 1 \leq m \leq M(t))$ may correspond to the channel gain as explained in EQ. 5 above. In this case, the recursive equations of 752 and 754 may be represented as follows:

$$\gamma_i^{(0)} = 0 \quad \text{(EQ. 12)}$$

$$\gamma_i^{(k_i)} = \gamma_i^{(k_i-1)} + \frac{1}{M(t_i(k_i))|S_i|}\sum_{s \in S_i}\sum_{m=1}^{M(t_i(k_i))}\frac{1}{\sigma^{(t_i(k_i))2}}\|h_s(m; t_i(k_i))\|^2.$$

This corresponds to the incremental SNR approach, e.g., process 700 of FIG. 7A above and is a recursive way of computing the ordering metric $\gamma_i^{(k_i)}$ of EQ. 10.

At 756, it is determined whether codeword i was successfully transmitted during transmission time t. If codeword i was successfully transmitted, then the corresponding recursive metric is reset to zero (i.e., 752 is performed). Otherwise, the recursive metric may continue to be updated at 754.

The recursive implementation described in FIG. 7B above may apply to various combination functions and various types of channel qualities and/or performance metrics. While the recursive function in EQ. 12 implements the linear sum function corresponding to EQ. 10 above, other combinations, such as the geometric sum of EQ. 11 may also be implemented in a similar recursive fashion. These recursive implementations may reduce complexity and save time and/or memory, as these implementations may require only saving a last updated value of the recursive metric without having to save and/or re-process channel quality information for previous transmission attempts.

In some embodiments, the PER and/or channel quality may be represented using an equalizer-output SINR. This SINR may correspond to any type of equalizer, such as MMSE or ZF. This will be illustrated in FIGS. 8A, 8B, and 9 below.

FIG. 8A is a flow diagram illustrating process 800 for determining a history-aware SIC ordering using incremental equalizer-output SINR, in accordance with embodiments of the present disclosure. Process 800 includes 802 and 804, and may be implemented in processing circuitry of receiver 180 of FIG. 1 or receiver/interference cancellation blocks of FIG. 2.

At 802, for each received codeword i that was transmitted at transmission time t, an ordering metric may be computed based on an equalizer-output SINR value associated with each one of multiple transmission attempts of codeword i up to the current transmission time t. For example, a stream $SINR_s(m)$ value may be computed for a stream s and a coded symbol m corresponding to codeword i for each transmission attempt.

In some embodiments, the $SINR_s(m)$ may be calculated as the quotient between the average received modulated subcarrier power and the average received co-channel interference power, i.e. cross-talk, from other transmitters than the useful signal. In some implementations, the SINR values may be computed using signal power and noise power estimation selection circuitry and SINR estimate computation circuitry. These components may be implemented in the processing circuitry of receiver 180 of FIG. 1 or of receiver/interference cancellation blocks of FIG. 2 by a single integrated circuit (IC) or as separate components in a circuit board or implemented on a programmable logic device. In these implementations, the $SINR_s(m)$ may be by estimated by computing an estimated average of the desired signal power (signal power) and an estimated variance of the noise plus interference power (noise power). The SINR corresponds to the ratio of the signal power to the noise power.

The $SINR_s(m)$ values may be combined to compute a codeword SINR value corresponding to a transmission attempt j of codeword i. For example, the $SINR_s(m)$ values may be averaged over all streams s in the stream set $S_i$ of codeword i and over all coded symbol vectors m (m=1, ..., $M(t_i(j))$) corresponding to codeword i at transmission time $t_i(j)$ to compute the codeword SINR value as follows:

$$SINR_i^{(j)} = \frac{1}{M(t_i(j))|S_i|} \sum_{s \in S_i} \sum_{m=1}^{M(t_i(j))} SINR_s^{(j)}(m).$$

The ordering metric $\gamma_i^{(k_i)}$ may be computed by combining, using a specific combination function, the codeword SINR values corresponding to codeword i over multiple transmission attempts of codeword i (up to the current transmission attempt $k_i$). In one embodiment, a linear sum may be used to combine these SINR values as follows:

$$\gamma_i^{(k_i)} = \sum_{j=1}^{k_i} \left( \frac{1}{M(t_i(j))|S_i|} \sum_{s \in S_i} \sum_{m=1}^{M(t_i(j))} SINR_s^{(j)}(m) \right), \quad \text{(EQ. 13)}$$

where $SINR_s^{(j)}(m)$ represents the stream SINR value for the $s^{th}$ stream at the $j^{th}$ transmission attempt of codeword i and the operand of the outer summation represents the codeword SINR value $SINR_i^{(j)}$ associated with the $j^{th}$ transmission attempt. Any other combination function may be used to combine the codeword SINR values, for example, a geometric sum.

At 804, a decoding order is determined based on the ordering metrics computed at 802. In some embodiments, this ordering may be derived by sorting the ordering metrics (i.e., the sums of SINR values) from highest to lowest, i.e., $$\Pi^{(t)} = \left\{ L_1, \ldots L_C \mid \gamma_{L_1}^{(k_{L_1})} \geq \gamma_{L_2}^{(k_{L_2})} \geq \ldots \geq \gamma_{L_C}^{(k_{L_C})} \right\}.$$

In some embodiments, the SINR may be updated recursively to reduce complexity. FIG. 8B is a flow diagram illustrating process 850 for recursively updating ordering metrics using the incremental SINR approach of FIG. 8A, in accordance with embodiments of the present disclosure. Process 850 includes 802, 804, 806, and 808, and may be implemented in processing circuitry of receiver 180 of FIG. 1 or receiver/interference cancellation blocks of FIG. 2.

At 852, an ordering metric $\gamma_{i,before}^{(k_i)}$ may be computed for each codeword i that does not take into account the effect of interference cancellation on the decoding of codeword i at its current transmission attempt $k_i$. This metric will be referred to herein as a pre-SIC ordering metric. In some embodiments, the pre-SIC recursive metric $\gamma_{i,before}^{(k_i)}$ may be computed by updating the value of a recursive metric $\gamma_i^{(k_i-1)}$ associated with a $(k_i-1)^{th}$ transmission attempt. In some embodiments, this recursive metric $\gamma_i^{(k_i-1)}$ may itself be a pre-SIC metric that does not consider the interference cancellation of the codewords transmitted at a previous transmission time. In other embodiments, this ordering metric $\gamma_i^{(k_i-1)}$ may have considered cancellation interference on decoding codeword i the $(k_i-1)^{th}$ transmission attempt (i.e., $\gamma_i^{(k_i-1)}$ may be a post-SIC ordering metric).

In some embodiments, the pre-SIC ordering metric $\gamma_{i,before}^{(k_i)}$ may be computed by combining the ordering metric $\gamma_i^{(k_i-1)}$ (pre-SIC or post-SIC) with pre-SIC SINR values. These pre-SIC SINR values (also referred to as $SINR_{before}$) may be computed assuming the corresponding codeword i is decoded without any interference cancellation. For example, these $SINR_{before}$ values may be computed by assuming that the codewords are decoded using a linear equalizer with no SIC.

In some embodiments, the ordering metric $\gamma_i^{(k_i-1)}$ may be added to the codeword SINR value using a linear sum as follows:

$$\gamma_{i,before}^{(k_i)} = \gamma_i^{(k_i-1)} + \frac{1}{M(t_i(k_i))|S_i|} \sum_{s \in S_i} \sum_{m=1}^{M(t_i(k_i))} SINR_{s,before}^{(k_i)}(m), \quad \text{(EQ. 14)}$$

where $SINR_{s,before}^{(k_i)}(m)$ represents the stream $SINR_{before}$ value for the $s^{th}$ stream at the $k_i^{th}$ transmission attempt of codeword i. The second operand in EQ. 14 may be defined as a codeword SINR value of codeword i at the $k_i^{th}$ transmission attempt. This codeword SINR value corresponds to the average of the stream $SINR_{before}$ values ($SINR_{s,before}^{(k_i)}(m)$) over all streams s and all coded symbols of codeword i at the $k_i^{th}$ transmission attempt. While EQ. 14 shows a linear sum, any other combination function may be used to combine the recursive metric $\gamma_i^{(k_i-1)}$ with the codeword SINR value, such as geometric sum.

At 854, a decoding ordering $\Pi^{(t)}$ may be determined based on the pre-SIC ordering metrics. For example, the decoding ordering may be determined by sorting the codewords based on their corresponding pre-SIC ordering metrics from highest to lowest. This may be represented as follows:

$$\Pi^{(t)} = \{(L_1, L_2, \ldots, L_C) | \gamma_{L_1, before}^{(k_i)} \geq \gamma_{L_2, before}^{(k_i)} \geq \ldots \geq \gamma_{L_C, before}^{(k_i)}\}.$$

At 856, the codewords may be decoded using SIC based on the determined ordering $\Pi^{(t)}$. For example, codewords $L_1$ through $L_C$ may be decoded with interference cancellation as described in FIG. 2 above.

At 858, an updated post-SIC ordering metric $\gamma_i^{(k_i)}$ may be computed based on updated SINR values of codeword i that take into account interference cancellation. These SINR values may correspond to SIC-adjusted channels and take into account the interference cancellation gained from a codeword decoded in the ordering determined at 854. For example, the ordering metric for codeword i associated with transmission time $t_i(k_i)$ may be updated using the following recursive equation:

$$\gamma_i^{(k_i)} = \gamma_i^{(k_i-1)} + \frac{1}{M(t_i(k_i))|S_i|} \sum_{s \in S_i} \sum_{m=1}^{M(t_i(k_i))} SINR_{s,after}^{(k_i)}(m); \quad \text{(EQ. 15)}$$

$$\gamma_i^{(0)} = 0,$$

wherein $SINR_{s,after}^{(j)}$ represents the stream $SINR_{after}$ value for the $s^{th}$ stream at the $j^{th}$ transmission attempt of codeword i taking into account the interference cancellation gain for codeword i. In one example, $SINR_{after}$ may assume a SIC equalizer with perfect interference cancellation (i.e., no error propagation between SIC stages).

Although EQ. 15 above uses equalizer-output SINR values, this is meant to be illustrative and not limiting or exhaustive in any way. Any other suitable performance metric may be used. For example, the SNR values used in the incremental SNR-based process 750 of FIG. 7B may be understood as a post-SIC SINR value since perfect interference cancellation is assumed.

In some embodiments, if a codeword decoded at a specific SIC stage is not recovered error-free, then errors may propagate to the interference cancellation of subsequent SIC stages, thereby degrading performance. This is referred to as error propagation. In some embodiments, the post-SIC SINR values may also account for error propagation and compensate for it using error compensation (EC). This will be illustrated in FIG. 9 below.

FIG. 9 illustrates one example of the incremental SINR based ordering approach of FIG. 8B, in accordance with some embodiments. FIG. 9 uses an exemplary MMSE equalizer in a 2×2 MIMO system with two codewords (i=1, 2) and one stream per codeword ($S_i$={i}).

An example of pre-SIC SINR values, e.g., as used at 852 of FIG. 8B above, is shown in EQ. 902 of FIG. 9. As can be seen from EQ. 902, $SINR_{s,before}(m)$ values do not take into account interference cancellation, and correspond to a linear MMSE equalizer SINR (i.e., without SIC).

An example of post-SIC SINR values, e.g., as used at 858 of FIG. 8B above, is shown in EQ. 904 of FIG. 9. This post-SIC SINR of EQ. 904 takes into account the SIC ordering. Specifically, EQ. 904 considers the effect of cancelling the interference due to the first decoded codeword $L_1$ from the second decoded codewords $L_2$. At 906, for the first decoded codeword $L_1$, $SINR_{s,after}(m)$ is the same as $SINR_{s,before}(m)$, since no interference cancellation is applied to this first codeword. At 908, for the second decoded codeword $L_2$, $SINR_{s,after}(m)$ takes into account the effect of cancelling the interference due to $L_1$ from $L_2$. In particular, as shown in EQ. 904, the $SINR_{s,after}(m)$ for codeword $L_2$ is based on the interference-adjusted channel $h_{L_2}$ associated with codewords $L_2$, e.g., obtained by removing the columns corresponding to the channels for the first decoded codeword $L_1$ from the overall effective channel H as described in FIG. 2 above.

As explained above, the post-SIC SINR values of EQ. 904 assume perfect interference cancellation (i.e., these values do not take into account any error propagation). In some embodiments, in addition to considering the effect of interference cancellation, the $SINR_{s,after}(m)$ for the codeword $L_2$ may also take into account error propagation. An example of a post-SIC SINR values that consider both SIC ordering and error compensation is shown in EQ. 920. Like EQ. 904, EQ. 920 considers the effect of SIC by using the interference-adjusted channel $h_{L_2}$. Additionally, EQ. 920 integrates an error compensation component 922 to compensate for the error propagation from the first SIC decoding stage.

This error compensation component may correspond to an error between the reconstructed transmitted signal vector $\hat{x}_{L_1}$ for codeword $L_1$ (i.e., the feedback symbols as explained in FIG. 2 above) and the transmitted signal vector $x_{L_1}$ (i.e., the actually transmitted symbols). This may be represented as an error variance estimate corresponding to the first decoded codeword $L_1$ at the current transmission time (corresponding to transmission attempt $k_{L_1}$) as follows:

$$E[|e|^2] = E\left[\left|x_{L_1}^{(k_{L_1})} - \hat{x}_{L_1}^{(k_{L_1})}\right|^2\right]. \quad \text{(EQ. 16)}$$

In some embodiments, the error variance of EQ. 16 may be difficult or impossible to compute. In this case, the error variance may be approximated based on an estimated transmitted signal vector $\tilde{x}_{L_i}$, as follows:

$$E[|e|^2] \approx \frac{1}{M(t)} \sum_m \left|\tilde{x}_{L_1}^{(k)}(m) - \hat{x}_{L_1}^{(k)}(m)\right|^2,$$

where the estimated transmitted signals $\tilde{x}_{L_1}(m)$ are averaged over M(t) coded symbols m transmitted at time t for codeword $L_1$. In some embodiments, the estimated transmitted signal vector $\tilde{x}_{L_1}(m)$ may be determined based on soft information. For example, this soft information may be output by an equalizer based on a log-likelihood ratio ("LLR") for each received symbol of intended information.

Figure 10A:
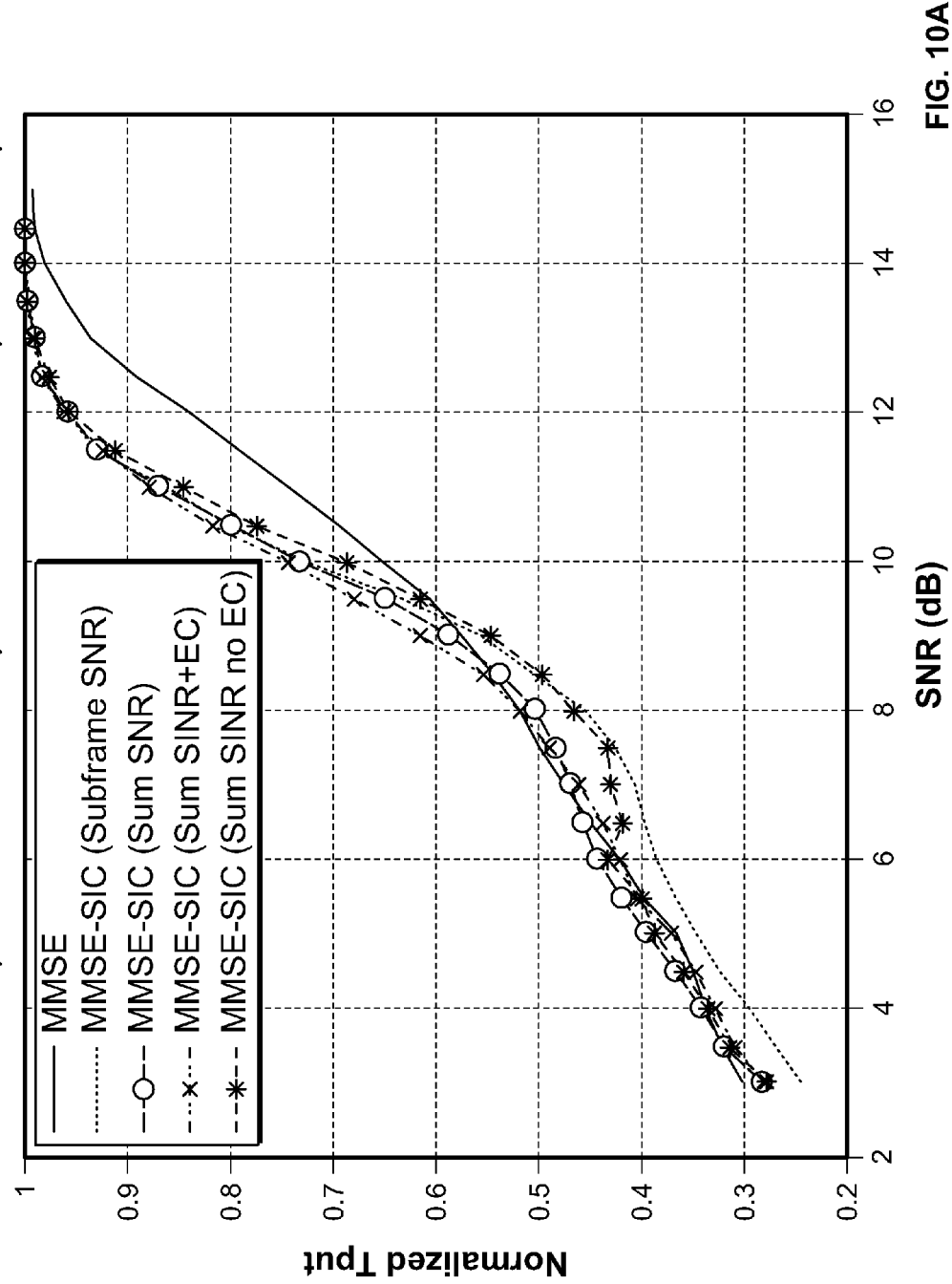
FIG. 10A shows a simulated performance of processes for determining SIC ordering in a closed loop MIMO system using minimum mean square error (MMSE) decoding, in accordance with some embodiments of the present disclosure.
Figure 10B:
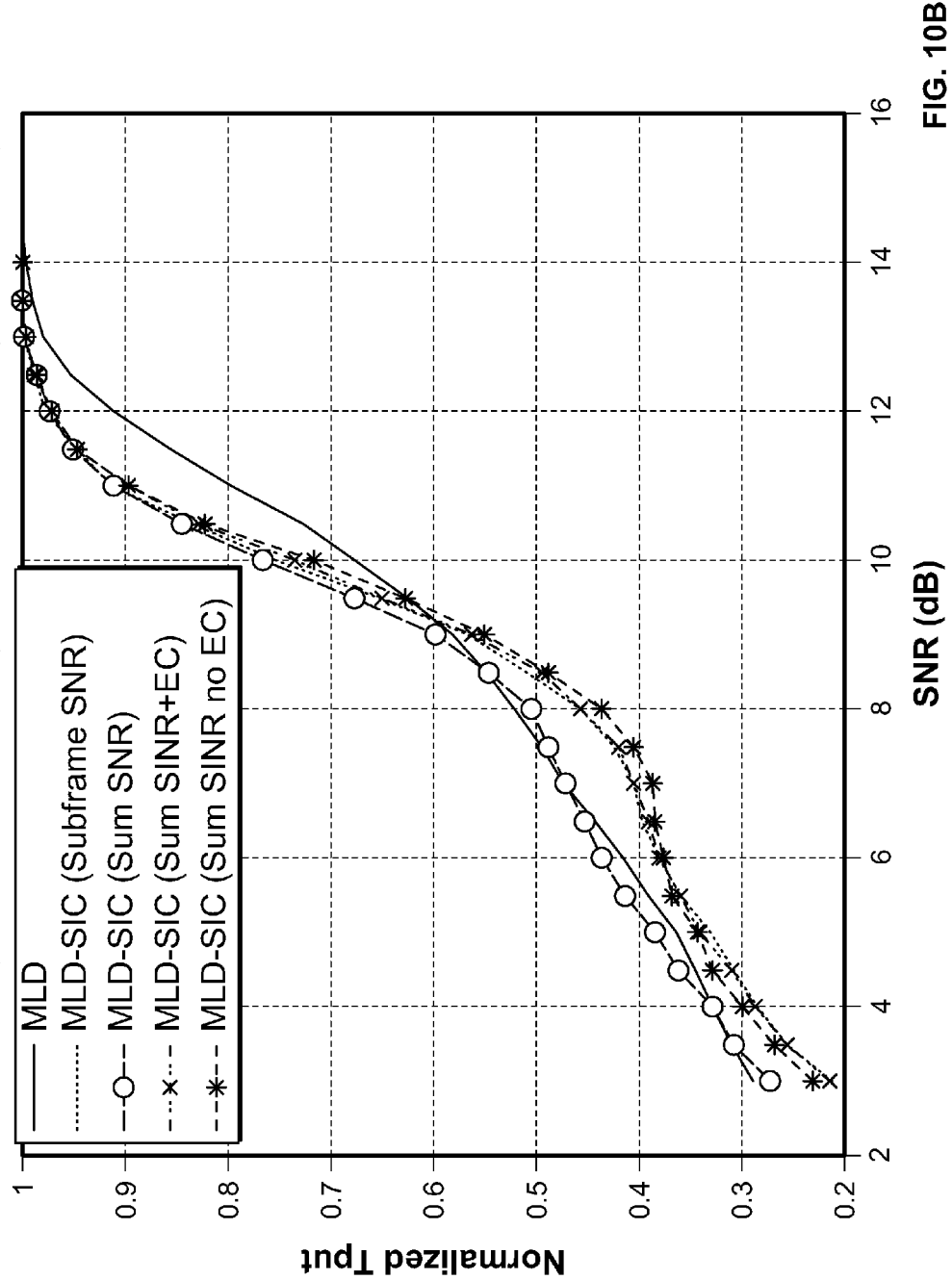
FIG. 10B shows a simulated performance of processes for determining SIC ordering in a closed loop MIMO system using maximum likelihood decoding (MLD), in accordance with some embodiments of the present disclosure.

FIGS. 10A and 10B (collectively referred to as FIG. 10 herein) illustrate the performance of three history-aware SIC ordering processes (incremental SNR, incremental SINR, and incremental SINR with error compensation) compared to a history-free SIC ordering process and a decoding process using a linear receiver (with no SIC). The simulations are based on the PDSCH demodulation test case 5.2 specified in the 3GPP TS36.101 V8.8.0 "User Equipment (UE) radio transmission and reception" specification, which is hereby incorporated by reference in its entirety. In the simulations of FIG. 10, a 2×2 MIMO low correlation implementation is used with carrier bandwidth of 10 MHZ, 16QAM modulation scheme, and code rate 1/2. The simulated systems transmit two codewords (C=1) each mapped to one stream, and use a maximum of 4 HARQ retransmissions and a random precoder with ideal channel estimation (CE). The simulated 5.2 test case is associated with a closed loop MIMO (CL-MIMO) system with spatial multiplexing (SM), random beamforming, and TU-70.

FIG. 10A shows a simulated performance of processes for determining SIC ordering in a closed loop MIMO system using minimum mean square error (MMSE) decoding, in accordance with embodiments of the present disclosure. The x axis represents Signal-to-Noise ratio (SNR) (in decibels (db)) and the y axis represents normalized throughput (i.e., the percentage of the peak data rate).

The first graph labeled "MMSE," corresponding to solid line 1, represents the performance of a decoding process that uses the linear receiver without any interference cancellation.

The second graph labeled "MMSE-SIC (subframe SNR)," corresponding to dashed line 2, represents the performance of the MMSE equalizer with SIC using a history-free SIC ordering. For this graph, the two codewords are ordered based on the subframe channel gain (i.e., subframe SNR) at the receiving time only, without regard to previous transmission attempts of the codewords. An MMSE equalizer is used to decode the first codeword $L_1$ in the determined history-free SIC ordering. SIC is used to decode the second codeword $L_1$ in the determined ordering.

The third graph labeled "MMSE-SIC (sum SNR)," corresponding to line 3 (marked with 'o'), represents the performance of the incremental SNR ordering using a linear sum of channel gains, e.g., as described in EQS. 10 and 12 and FIGS. 7A and 7B above.

The fourth graph labeled "MMSE-SIC (sum SINR+EC)," corresponding to line 4 (marked with 'x'), represents the performance of the incremental SINR ordering using a linear sum of MMSE-type SINR values (e.g., based on an MMSE criterion) and using error compensation, e.g., as described in EQS. 13 and 16 and in FIGS. 8A, 8B, and 9B above. For this graph, an MMSE-type $SINR_{before}$ is used to determine the SIC ordering of the two codewords, and an MMSE-type $SINR_{after}$ is used to update the ordering metrics after performing SIC, as described in EQS. 14 and 15 and in FIG. 8B above.

The fifth graph labeled "MMSE-SIC (sum SINR no EC)," corresponding to line 5 (marked with '*'), represents the performance of the incremental SINR ordering using a linear sum of MMSE-type SINR values and no error compensation, e.g., as described in EQS. 13, 14, and 15, and in FIGS. 8A, 8B, and 9A above. Similarly to the process of the fourth graph, an MMSE-type $SINR_{before}$ is used to determine the SIC ordering of the two codewords, and an MMSE-type $SINR_{after}$ is used to update the ordering metrics after performing SIC.

A comparison between the five performance graphs shows that the incremental SINR based approach with error compensation (i.e., corresponding to graph 4) improves the performance gain at low SNR values and maintains the performance gain at high SNR values. The incremental SINR based approach with EC is consistently better than the linear receiver based approach (i.e., corresponding to graph 1). A comparison between graphs 4 and 5 shows that error compensation may be critical for the incremental SINR approach in this particular simulation. Also, the incremental SNR based approach (i.e., corresponding to graph 3) improves the performance gain compared to the linear receiver approach (i.e., corresponding to graph 1) and to the conventional MMSE-SIC approach (i.e., corresponding to graph 2), but the improvement is slightly less than that of the incremental SINR based approach with EC (i.e., corresponding to graph 5).

FIG. 10B shows a simulated performance of processes for determining SIC ordering in a closed loop MIMO system using maximum likelihood decoding (MLD), in accordance with some embodiments of the present disclosure. The x axis represents Signal-to-Noise ratio (SNR) (in decibels (db)) and the y axis represents normalized throughput. The five graphs correspond to the same processes illustrated in FIG. 10A, except that the equalizer uses MLD instead of MMSE.

A comparison between the five performance graphs shows that MLD-SIC works best with the incremental SNR based approach (i.e., corresponding to graph 3), which improves the performance gain at low SNR values and maintains the performance gain at high SNR values. The incremental SINR based approach (i.e., corresponding to graphs 4 and 5), which uses MMSE-type SINR values, does not appear to be optimal for the MLD performance in this test case.

Figure 11A:
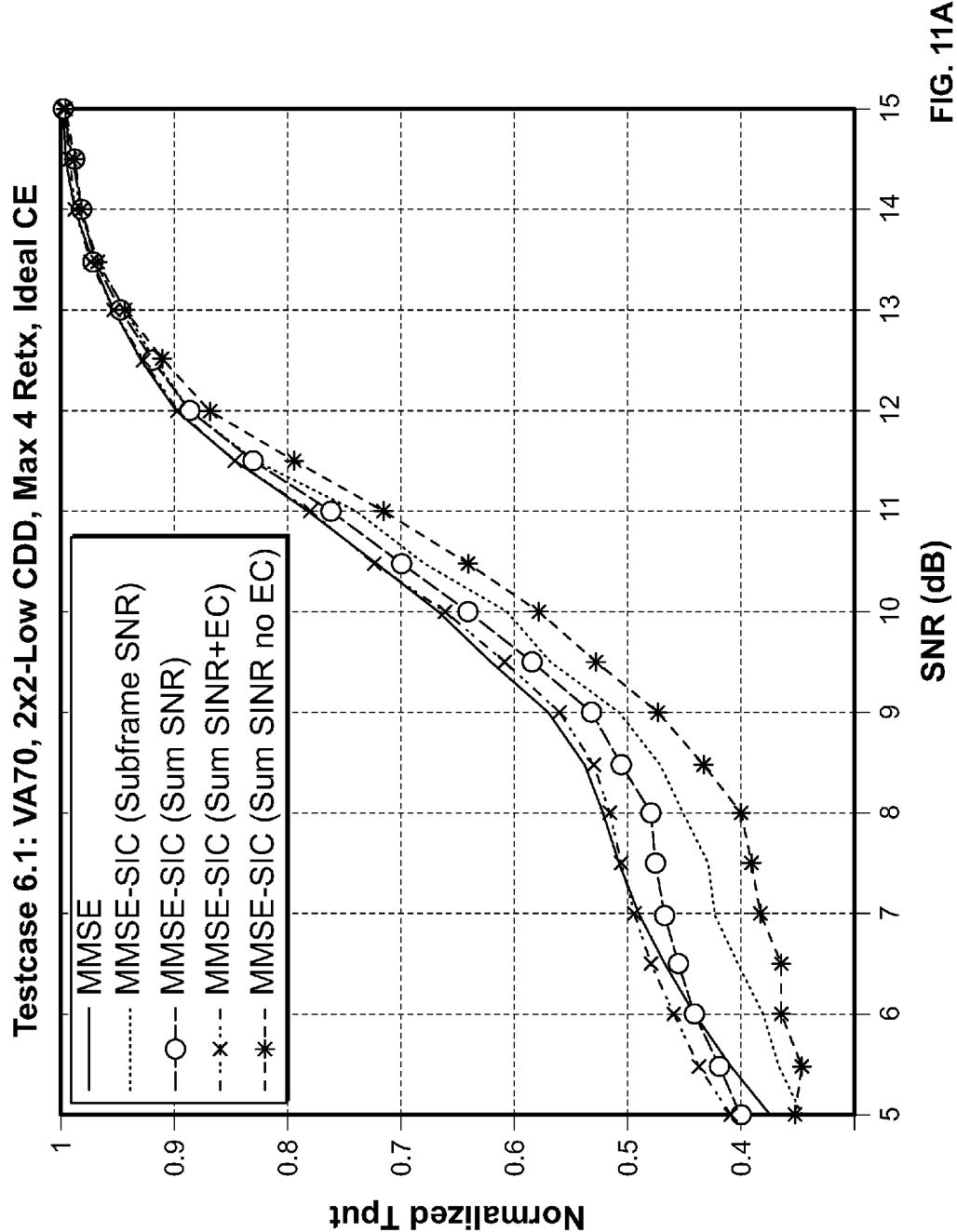
FIG. 11A shows a simulated performance of processes for determining SIC ordering in an open loop MIMO system using MMSE decoding, in accordance with some embodiments of the present disclosure.

FIGS. 11A and 11B (collectively referred to as FIG. 11 herein) illustrate the performance of three history-aware SIC ordering processes (incremental SNR, incremental SINR, and incremental SINR with error compensation) compared to a history-free SIC ordering process and a decoding process using a linear receiver (with no SIC). The simulations are based on the PDSCH demodulation test case 6.1 specified in the 3GPP TS36.101 V8.8.0 specification. A 2×2 MIMO low correlation implementation is used with carrier bandwidth of 10 MHZ, 16QAM modulation scheme, and code rate 1/2. The simulated systems transmit two codewords (C=1) each mapped to one stream, and use a maximum of 4 HARQ retransmissions and a random precoder with ideal channel estimation (CE). The simulated 6.1 test case is associated with an open loop MIMO (OL-MIMO) with large cyclic delay cyclic diversity (LD-CDD), and VA-70.

FIG. 11A shows a simulated performance of processes for determining SIC ordering in an open loop MIMO system using minimum mean square error (MMSE) decoding, in accordance with some embodiments of the present disclosure. The x axis represents Signal-to-Noise ratio (SNR) (in decibels (db)) and the y axis represents normalized throughput. The five graphs correspond to the same processes illustrated in FIG. 10A above.

A comparison of the performance graphs shows that, in this test case, SIC does not perform as well as a decoding process using a linear receiver (with no SIC). This is because LD-CDD uses channels of the same quality for both transmitted codewords, so that SIC leads to error propagation but little interference cancellation gain. This is why the history-free SIC approach (i.e., corresponding to graph 2) does not perform well because it does not compensate for error propagation. Still, the incremental SNR based approach and the incremental SINR with EC based approach (i.e., corresponding to graphs 3 and 4) improve the performance compared to the history-free SIC approach. In addition, the incremental SINR with EC based approach performs almost as well as the linear receiver approach.

FIG. 11B shows a simulated performance of processes for determining SIC orderings in an closed loop MIMO system using MLD, in accordance with some embodiments of the present disclosure. The x axis represents Signal-to-Noise ratio (SNR) (in decibels (db)) and the y axis represents normalized throughput. The five graphs correspond to the same processes illustrated in FIG. 10B above. In this test case, the incremental SNR (i.e., corresponding to graph 3) performs best compared to the SIC processes, but still represents some loss compared to the linear receiver approach because of the suboptimality of SIC in this particular test case.

The above steps of the flowcharts of FIGS. 3, 4, 5, 6, 7A, 7B, 8A, and 8B may generally be executed or performed in any order or sequence not limited to the order and sequence shown and described in the figure. Also, some of the above steps of processes of FIGS. 3, 4, 5, 6, 7A, 7B, 8A, and 8B may be executed or performed substantially simultaneously where appropriate or in parallel to reduce latency and processing times. Any of the steps in these processes may be omitted, modified, combined, and/or rearranged, and any additional steps may be performed, without departing from the scope of the present disclosure.

The foregoing describes systems and methods for reliable and efficient information transmission. Those skilled in the art will appreciate that the disclosed methods and systems can be practiced by other than the described embodiments, which are presented for the purpose of illustration rather than of limitation. Modifications and variations are possible in light of the above teachings or may be acquired from practice of the disclosed methods and systems. For example, although the present disclosure primarily discusses using all transmission times $\gamma = t_i(1), \ldots, t_i(k_i)$ for computing ordering metric $\gamma_i(t)$ of a codeword i, starting from the first transmission attempt through the last transmission attempt at time t, any appropriate subset of τ may be used in this computation. For example, only a last number of transmission attempts may be used. While certain components of this disclosure have been described as implemented in hardware and others in software, other configurations may be possible.

What is claimed is:

1. A method for determining a successive interference cancellation (SIC) ordering in a system with a retransmission protocol, the method comprising:
   receiving a plurality of codewords that are transmitted in a current transmission time, wherein at least one of the plurality of codewords was previously transmitted in a previous transmission time;
   for the at least one previously transmitted codeword, computing an ordering metric for the codeword based on i) a first channel associated with the previous transmission time and ii) a second channel associated with the current transmission time; and
   determining a decoding ordering of the codewords based on the computed ordering metric.

2. The method of claim 1, wherein computing the ordering metric for the at least one previously transmitted codeword comprises computing the ordering metric based on channels associated with any subset of all transmission times corresponding to all transmission attempts of the codeword.

3. The method of claim 1, wherein computing the ordering metric for the at least one previously transmitted codeword comprises:
   mapping the first and second channels to an effective Signal-to-Noise ratio (SNR) value for each unique transmitted symbol of the codeword; and
   estimating a Packet Error Rate (PER) value of the codeword based on the effective SNR values.

4. The method of claim 1, wherein computing the ordering metric for the at least one previously transmitted codeword comprises combining i) a first channel gain associated with the previous transmission time and ii) a second channel gain associated with the current transmission time.

5. The method of claim 1, wherein computing the ordering metric for the at least one previously transmitted codeword comprises combining i) a first equalizer-output Signal-to-Interference and Noise Ratio (SINR) value associated with the previous transmission time and ii) a second equalizer-output SINR value associated with the current transmission time.

6. The method of claim 1, wherein computing the ordering metric for the at least one previously transmitted codeword comprises:
   initializing a recursive metric for the codeword prior to a first transmission attempt of the codeword; and
   updating the recursive metric for a $k^{th}$ transmission attempt of the codeword based on a value of the recursive metric for a $(k-1)^{th}$ transmission attempt of the codeword.

7. The method of claim 6, further comprising:
   determining that the codeword was successfully transmitted at the current transmission time; and
   resetting the recursive metric in response to determining that the codeword was successfully transmitted.

8. The method of claim 6, further comprising:
   computing an ordering metric for the $k^{th}$ transmission attempt of the codeword based on i) the value of the recursive metric for a $(k-1)^{th}$ transmission attempt of the codeword and ii) a performance metric, wherein the performance metric is determined prior to performing interference cancellation;
   determining the decoding order based on the initial recursive metric;
   computing an updated performance metric based on the determined decoding order; and
   updating the recursive metric at the $k^{th}$ transmission attempt of the codeword based on i) the value of the recursive metric for a $(k-1)^{th}$ transmission attempt of the codeword and ii) the updated performance metric.

9. The method of claim 1, further comprising:
   estimating an error due to decoding a first codeword; and
   estimating a performance metric for a second codeword based on the estimated error, wherein the second codeword is decoded after the first codeword, and wherein an interference from the first codeword is cancelled from the second codeword.

10. The method of claim 1, wherein the retransmission protocol is selected from the group consisting of a hybrid automatic repeat request (HARQ) protocol, an automatic repeat request (ARQ) protocol, and a repetition coding and transmission protocol.

11. A receiver for determining a successive interference cancellation (SIC) ordering for a plurality of codewords, the receiver comprising processing circuitry configured to:
   receive a plurality of codewords that are transmitted in a current transmission time, wherein at least one of the plurality of codewords was previously transmitted in a previous transmission time;
   for the at least one previously transmitted codeword, compute an ordering metric for the codeword based on i) a first channel associated with the previous transmission time and ii) a second channel associated with the current transmission time; and
   determine a decoding ordering of the codewords based on the computed ordering metric.

12. The receiver of claim 11, wherein the processing circuitry is further configured to compute the ordering metric based on channels associated with any subset of all transmission times corresponding to all transmission attempts of the codeword.

13. The receiver of claim 11, wherein the processing circuitry is further configured to:
   map the first and second channels to an effective Signal-to-Noise ratio (SNR) value for each unique transmitted symbol of the codeword; and estimate a Packet Error Rate (PER) value of the codeword based on the effective SNR values.

14. The receiver of claim 11, wherein the processing circuitry is further configured to combine i) a first channel gain associated with the previous transmission time and ii) a second channel gain associated with the current transmission time.

15. The receiver of claim 11, wherein the processing circuitry is further configured to combine i) a first equalizer-output Signal-to-Interference and Noise Ratio (SINR) value associated with the previous transmission time and ii) a second equalizer-output SINR value associated with the current transmission time.

16. The receiver of claim 11, wherein the processing circuitry is further configured to:
  initialize a recursive metric for the codeword prior to a first transmission attempt of the codeword; and
  update the recursive metric for a $k^{th}$ transmission attempt of the codeword based on a value of the recursive metric for a $(k-1)^{th}$ transmission attempt of the codeword.

17. The receiver of claim 16, wherein the processing circuitry is further configured to:
  determine that the codeword was successfully transmitted at the current transmission time; and
  reset the recursive metric in response to determining that the codeword was successfully transmitted.

18. The receiver of claim 16, wherein the processing circuitry is further configured to:
  compute an ordering metric for the $k^{th}$ transmission attempt of the codeword based on i) the value of the recursive metric for a $(k-1)^{th}$ transmission attempt of the codeword and ii) a performance metric, wherein the performance metric is determined prior to performing interference cancellation;
  determine the decoding order based on the initial recursive metric;
  compute an updated performance metric based on the determined decoding order; and
  update the recursive metric at the $k^{th}$ transmission attempt of the codeword based on i) the value of the recursive metric for a $(k-1)^{th}$ transmission attempt of the codeword and ii) the updated performance metric.

19. The receiver of claim 11, wherein the processing circuitry is further configured to:
  estimate an error due to decoding a first codeword; and
  estimate a performance metric for a second codeword based on the estimated error, wherein the second codeword is decoded after the first codeword, and wherein an interference from the first codeword is cancelled from the second codeword.

20. The receiver of claim 11, wherein the wherein the retransmission protocol is selected from the group consisting of a hybrid automatic repeat request (HARQ) protocol, an automatic repeat request (ARQ) protocol, and a repetition coding and transmission protocol.

* * * * *